(12) United States Patent
Revadigar et al.

(10) Patent No.: US 12,375,915 B2
(45) Date of Patent: Jul. 29, 2025

(54) AUTHENTICATION METHOD AND DEVICE, AND RELATED PRODUCTS

(71) Applicant: SHENZHEN YINWANG INTELLIGENT TECHNOLOGIES CO., LTD., Shenzhen (CN)

(72) Inventors: Girish Revadigar, Singapore (SG); Zhuo Wei, Singapore (SG); Zhen Li, Shanghai (CN); Sanjay Jha, New South Wales (AU)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 136 days.

(21) Appl. No.: 18/328,313

(22) Filed: Jun. 2, 2023

(65) Prior Publication Data

US 2023/0328523 A1   Oct. 12, 2023

Related U.S. Application Data

(63) Continuation of application No. PCT/CN2020/134068, filed on Dec. 4, 2020.

(51) Int. Cl.
H04L 29/06       (2006.01)
H04W 12/033      (2021.01)
H04W 12/062      (2021.01)

(52) U.S. Cl.
CPC ....... *H04W 12/062* (2021.01); *H04W 12/033* (2021.01)

(58) Field of Classification Search
None
See application file for complete search history.

(56) References Cited

U.S. PATENT DOCUMENTS

| | | | |
|---|---|---|---|
| 9,066,327 B2 | 6/2015 | Liu | |
| 10,389,568 B1* | 8/2019 | Shattil | H04L 5/0035 |
| 10,440,576 B1 | 10/2019 | Casamassima et al. | |
| 10,679,019 B1* | 6/2020 | Thomas | G06K 7/10158 |
| 10,983,507 B2* | 4/2021 | Cella | G05B 19/4155 |
| 11,036,215 B2* | 6/2021 | Cella | G05B 19/4184 |

(Continued)

FOREIGN PATENT DOCUMENTS

| | | |
|---|---|---|
| GB | 2561583 A | 10/2018 |
| WO | 2020210990 A1 | 10/2020 |

OTHER PUBLICATIONS

Zhang, Kun; Wang, Cuirong. A new Group Key Management Scheme with simple hash based authentication for wireless sensor networks. 2010 International Conference on Computer Design and Applications. https://ieeexplore.ieee.org/stamp/stamp.jsp?tp=&arnumber=5541273 (Year: 2010).*

(Continued)

*Primary Examiner* — Jeremiah L Avery
(74) *Attorney, Agent, or Firm* — Fish & Richardson P.C.

(57) ABSTRACT

The present disclosure relates to an authentication method. An example method includes: a first authentication device obtaining first signal feature information according to a first wireless signal sent by a second authentication device, receiving second signal feature information from the second authentication device, and determining whether authentication is successful according to the first signal feature information and the second signal feature information.

20 Claims, 14 Drawing Sheets

(56) References Cited

U.S. PATENT DOCUMENTS

| | | | | |
|---|---|---|---|---|
| 11,075,786 | B1* | 7/2021 | Shattil | H04L 45/24 |
| 11,199,835 | B2* | 12/2021 | Cella | G06N 3/047 |
| 11,199,837 | B2* | 12/2021 | Cella | G06N 5/046 |
| 11,206,549 | B1* | 12/2021 | Eyuboglu | H04W 72/1273 |
| 2019/0044738 | A1* | 2/2019 | Liu | H04W 4/40 |
| 2019/0097793 | A1* | 3/2019 | Nix | H04L 63/0807 |
| 2019/0174449 | A1* | 6/2019 | Shan | H04W 60/04 |
| 2019/0174466 | A1* | 6/2019 | Zhang | H04L 5/0057 |
| 2019/0281587 | A1* | 9/2019 | Zhang | H04W 72/23 |
| 2019/0373464 | A1* | 12/2019 | Chari | H04L 63/083 |
| 2019/0373675 | A1* | 12/2019 | Chari | H04W 16/20 |
| 2020/0044844 | A1* | 2/2020 | Sridhara | H04W 12/03 |
| 2020/0221329 | A1* | 7/2020 | Kim | H04W 12/037 |
| 2020/0396744 | A1* | 12/2020 | Xiong | H04B 7/088 |
| 2020/0403804 | A1* | 12/2020 | Karmoose | H04L 9/0637 |
| 2021/0007149 | A1* | 1/2021 | Li | H04L 5/0091 |
| 2021/0022018 | A1* | 1/2021 | Belov | H04W 24/06 |
| 2021/0045125 | A1* | 2/2021 | Mondal | H04W 80/08 |
| 2021/0058826 | A1* | 2/2021 | Mao | H04W 28/0933 |
| 2021/0058970 | A1* | 2/2021 | Kwak | H04W 72/23 |
| 2021/0058989 | A1* | 2/2021 | Simsek | H04L 47/283 |
| 2021/0083911 | A1* | 3/2021 | Morozov | H04L 27/2636 |
| 2021/0084536 | A1* | 3/2021 | Chou | H04W 36/0085 |
| 2021/0091941 | A1* | 3/2021 | Pancras | H04L 9/0863 |
| 2021/0092759 | A1* | 3/2021 | Xiong | H04W 72/0446 |
| 2021/0105122 | A1* | 4/2021 | Xiong | H04L 5/0051 |
| 2021/0127351 | A1* | 4/2021 | Stojanovski | H04W 48/16 |
| 2021/0157848 | A1* | 5/2021 | Doshi | G06F 18/2155 |
| 2024/0411939 | A1* | 12/2024 | Gladwin | H04W 12/033 |

OTHER PUBLICATIONS

Chaudhary, Khyati, Shinde, Gitanjali. Survey on group authentication in wireless sensor networks. 2015 International Conference on Pervasive Computing (ICPC). https://ieeexplore.ieee.org/stamp/stamp.jsp?tp=&arnumber=7087199 (Year: 2015).*

Ji, Yafei et al. Chord: Thwarting Relay Attacks Among Near Field Communications. Information Security and Cryptology: 14th International Conference, Inscrypt 2018. Relevant pp. 329-348. https://link.springer.com/chapter/10.1007/978-3-030-14234-6_18 (Year: 2018).*

Chen, Dajiang et al. An LDPC Code Based Physical Layer Message Authentication Scheme With Prefect Security. IEEE Journal on Selected Areas in Communications, vol. 36, Issue: 4. https://ieeexplore.ieee.org/stamp/stamp.jsp?tp=&arnumber=8334238 (Year: 2018).*

Chen, Dajiang et al. Channel Precoding Based Message Authentication in Wireless Networks: Challenges and Solutions. IEEE Network, vol. 33, issue: 1. https://ieeexplore.ieee.org/stamp/stamp.jsp?tp=&arnumber=8360842 (Year: 2019).*

Mohindru, Vandana; Singh, Yashwant. Performance analysis of message authentication algorithms in wireless sensor networks. 2017 4th International Conference on Signal Processing, Computing and Control (ISPCC). https://ieeexplore.ieee.org/stamp/stamp.jsp?tp=&arnumber=8269724 (Year: 2017).*

Dodis et al., "Fuzzy Extractors: How to Generate Strong Keys from Biometrics and Other Noisy Data," CoRR, submitted Apr. 1, 2008, arXiv:cs/0602007v4, 47 pages.

Francillon et al., "Relay Attacks on Passive Keyless Entry and Start Systems in Modern Cars," Proceedings of Network and Distributed System Security (NDSS), Feb. 2011, 16 pages.

Saunt [Online], "Astonishing moment thieves use keyless hack to steal a £90,000 Tesla in Seconds from its owner's driveway," Aug. 21, 2019, retrieved on Sep. 27, 2024, retrieved from URL<https://www.dailymail.co.uk/news/article-7380763/Robbers-use-keyless-hack-steal-90-000-Tesla-30-seconds.html>, 45 pages.

Szczys [online], "New Bluetooth 5 Channel Hopping Reverse Engineered For Jamming And Hijacking," Aug. 10, 2019, retrived on Sep. 27, 2024, retrieved from URL <https://hackaday.com/2019/08/10/new-bluetooth-5-channel-hopping-reverse-engineered-for-jamming-and-hijacking/>, 10 pages.

Jasek, "Gattacking Bluetooth Smart Devices," SecuRing, Aug. 3, 2016, 15 pages.

Tse et al., "Fundamentals of wireless communications," Cambridge University Press, Apr. 20, 2005, 586 pages.

Juels et al., "A Fuzzy Commitment Scheme," Sep. 25, 2013, 21 pages.

Ji et al., "Chord: Thwarting Relay Attacks Among Near Field Communications," Advances in Databases and Information Systems, Feb. 21, 2019, pp. 329-348.

Revadigar et al., "ProxiCar: Proximity-Based Secure Digital Key Solution for Cars," 2020 International Conference on Communication Systems and Networks (COMSNETS), Jan. 7, 2020, pp. 282-289.

Menezes et al., "Data Integrity and Message Authentication," Handbook of Applied Cryptography, CRC Press Series on Discrete Mathematics and Its Applications, Jan. 1, 1997, pp. 359-364.

Extended European Search Report in European Appln No. 20964047.3, dated Dec. 5, 2023, 12 pages.

* cited by examiner

AUTHENTICATION METHOD AND DEVICE, AND RELATED PRODUCTS

CROSS-REFERENCE TO RELATED APPLICATIONS

This application is a continuation of International Application No. PCT/CN2020/134068, filed on Dec. 4, 2020, the disclosure of which is hereby incorporated by reference in its entirety.

TECHNICAL FIELD

The present disclosure relates to the technical field of intrusion prevention system technologies, and in particular, to an authentication method and a device, and related products.

BACKGROUND

Keyless entry systems (KES) for vehicles/automobiles are becoming more and more popular for their ease of usage, i.e., the physical key of the car need not be carried by every user, and multiple users can be authorized by the car's owner to use his/her car. These systems use a digital key stored in user's personal device e.g., mobile phone, which is provided to the user by a trusted entity at the time of user registration, and Bluetooth low energy (BLE) technology is used to communicate between the car and user's device.

The current solutions for keyless entry systems are vulnerable for relay attack and other active attack which is serious issue.

This background information is provided to reveal information believed by the applicant to be of possible relevance to the present disclosure. No admission is necessarily intended, nor should be construed, that any of the preceding information constitutes prior art against the present disclosure.

SUMMARY

Embodiments of the present disclosure provide an authentication method and a device, and related products.

The foregoing and other objects are achieved by the subject matter of the independent claims. Further implementation forms are apparent from the dependent claims, the description and the figures.

A first aspect the present disclosure relates to an authentication method, including: obtaining, by a first authentication device, first signal feature information by sampling a first wireless signal sent by a second authentication device, where the first signal feature information is used to indicate a feature of the first wireless signal; receiving, by the first authentication device, second signal feature information from the second authentication device, where the second signal feature information is obtained by the second authentication device by sampling a second wireless signal sent by the first authentication device, where the second signal feature information is used to indicate a feature of the second wireless signal; and determining, by the first authentication device, whether the authentication is successful according to the first signal feature information and the second signal feature information.

According to the embodiment of the present disclosure, the first authentication device obtains first signal feature information by sampling a first wireless signal sent by a second authentication device, receives second signal feature information from the second authentication device, and determines whether the authentication is successful according to the first signal feature information and the second signal feature information, due to reciprocity property of the wireless channel, if the first signal feature information and the second signal feature information show high correlation, then the authentication is successful, so the mutual authentication between the first authentication device and the second authentication device is realized, thereby the relay attack can be efficiently detected and avoided.

In a possible implementation form of the authentication according to the first aspect as such, the receiving, by the first authentication device, second signal feature information from the second authentication device includes: receiving, by the first authentication device, a first message including the second signal feature information, where the second signal feature information is encrypted according to a first key associated with the second authentication device, and the first message further includes a first message authentication code calculated for the second signal feature information using the first key or information about signing the second signal feature information with a private key of the second authentication device.

According to the embodiment of the present disclosure, the second signal feature information is encrypted according to a first key associated with the second authentication device, and the first message further includes a first message authentication code calculated for the second signal feature information using the first key or information about signing the second signal feature information with a private key of the second authentication device, which secures the second signal feature information.

In a possible implementation form of the authentication according to the first aspect as such, the obtaining, by the first authentication device, the first signal feature information by sampling the first wireless signal sent by a second authentication device includes: obtaining, by the first authentication device, a first signal feature information set by sampling multiple first wireless signals on multiple channels involved in a channel hopping; where the receiving, by the first authentication device, the second signal feature information from the second authentication device includes: receiving, by the first authentication device, a second message including a second signal feature information set from the second authentication device, where the second signal feature information set is obtained by sampling multiple second wireless signals on multiple channels involved in the channel hopping by the second authentication device, where the second signal feature information set is encrypted according to a first key associated with the second authentication device, where the second message further includes a second message authentication code calculated for the second signal feature information set using the first key or information about signing the second signal feature information set with a private key of the second authentication device; where the determining, by the first authentication device, whether the authentication is successful according to the first signal feature information and the second signal feature information includes: determining, by the first authentication device, a first similarity between the first signal feature information set and the second signal feature information set; and determining, by the first authentication device, the authentication is successful when the first similarity meets a threshold.

According to the embodiment of the present disclosure, a first signal feature information set is obtained by sampling multiple first wireless signals on multiple channels involved in a channel hopping, the encrypted second signal feature information set is received from the second authentication device, a first similarity between the first signal feature information set and the second signal feature information set is determined, and the authentication result is obtained according to the first similarity, so an accurate mutual authentication between the first authentication device and the second authentication device is realized, thereby the relay attack can be efficiently detected and avoided.

In a possible implementation form of the authentication according to the first aspect as such, the obtaining, by the first authentication device, the first signal feature information by sampling the first wireless signal sent by a second authentication device includes: obtaining, by the first authentication device, a first signal feature information set by sampling multiple first wireless signals on multiple channels involved in a channel hopping; the method further includes: applying, by the first authentication device, first quantization to the first signal feature information set with a first quantization parameter to generate a first bit string and a first helper data, where the first helper data is the first signal feature information that is discarded during the first quantization; where the receiving, by the first authentication device, the second signal feature information from the second authentication device includes: receiving, by the first authentication device, a third message including a second bit string from the second authentication device, where the second bit string is determined based on second quantization of a second signal feature information set by the second authentication device, where the second bit string is encrypted according to a first key associated with the second authentication device, where the third message further includes a third message authentication code calculated for the second bit string using the first key or information about signing the second bit string with a private key of the second authentication device; and where the determining, by the first authentication device, whether the authentication is successful according to the first signal feature information and the second signal feature information includes: determining, by the first authentication device, a second similarity between the first bit string and the second bit string; and determining, by the first authentication device, the authentication is successful when the second similarity meets a threshold.

According to the embodiment of the present disclosure, a first bit string is obtained by applying first quantization to the first signal feature information set with a first quantization parameter, an encrypted second bit string is received from the second authentication device, a second similarity between the first bit string and the second bit string is determined, and the authentication result is obtained according to the second similarity, so the mutual authentication between the first authentication device and the second authentication device is realized, thereby the relay attack can be efficiently detected and avoided accurately.

In a possible implementation form of the authentication according to the first aspect as such, the obtaining, by the first authentication device, the first signal feature information by sampling the first wireless signal sent by a second authentication device includes: obtaining, by the first authentication device, a first signal feature information set by sampling multiple first wireless signals on multiple channels involved in a channel hopping; the method further includes: applying, by the first authentication device, first quantization to the first signal feature information set with a first quantization parameter to generate a first bit string and a first helper data, where the first helper data is the first signal feature information that is discarded during the first quantization; determining, by the first authentication device, a first authentication parameter according to the first bit string; where the receiving, by the first authentication device, the second signal feature information from the second authentication device includes: receiving, by the first authentication device, a fifth message including a second authentication parameter from the second authentication device, where the second authentication parameter is determined according to a second bit string by the second authentication device, and the second bit string is determined based on second quantization of a second signal feature information set by the second authentication device, where the second authentication parameter is encrypted according to a first key associated with the second authentication device, where the fifth message further includes a fifth message authentication code calculated for the second authentication parameter using the first key or information about signing the second authentication parameter with a private key of the second authentication device; and where the determining, by the first authentication device, whether the authentication is successful according to the first signal feature information and the second signal feature information includes: determining, by the first authentication device, a third similarity between the first authentication parameter and a second authentication parameter; and determining, by the first authentication device, the authentication is successful when the third similarity meets a threshold.

According to the embodiment of the present disclosure, a first authentication parameter is determined according to the first bit string, if the third similarity between the first authentication parameter and the second authentication parameter meets a threshold, then the authentication is successful, so the mutual authentication between the first authentication device and the second authentication device is realized, thereby the relay attack can be efficiently detected and avoided accurately.

In a possible implementation form of the authentication according to the first aspect as such, the obtaining, by the first authentication device, the first signal feature information by sampling the first wireless signal sent by a second authentication device includes: obtaining, by the first authentication device, a first signal feature information set by sampling multiple first wireless signals on multiple channels involved in a channel hopping; the method further includes: applying, by the first authentication device, first quantization to the first signal feature information set with a first quantization parameter to generate a first bit string and a first helper data, where the first helper data is the first signal feature information that is discarded during the first quantization; receiving, by the first authentication device, a sixth message including the second helper data from the second authentication device, where the second helper data is encrypted according to a first key associated with the second authentication device, and the second helper data is determined based on the second quantization of the second signal feature information set by the second authentication device, and the second helper data is the second signal feature information that is discarded during the second quantization, where the sixth message further includes a sixth message authentication code calculated for the second helper data using the first key or information about signing the second helper data with a private key of the second authentication device; extracting, by the first authentication device, the second helper data from the second message; refining, by the first authentication device, the first bit string with the extracted second helper data; calculating, by the first authentication device, a third helper data according to the first helper data and the second helper data; transmitting, by the first authentication device, a seventh message including the third helper data to the second authentication device, where the third helper data is encrypted according to the first key, where the seventh message further includes a seventh message authentication code calculated for the third helper data using the first key or information about signing the third helper data with the private key of the second authentication device; determining, by the first authentication device, a third authentication parameter according to the refined first bit string; where the receiving, by the first authentication device, the second signal feature information from the second authentication device includes: receiving, by the first authentication device, an eighth message including a fourth authentication parameter from the second authentication device, where the fourth authentication parameter is determined according to a refined second bit string by the second authentication device, and the fourth authentication parameter is encrypted according to the first key, where the refined second bit string is the second bit string refined by the third helper data, where the eighth message further includes an eighth message authentication code calculated for the fourth authentication parameter using the first key or information about signing the fourth authentication parameter with the private key of the second authentication device; extracting, by the first authentication device, the fourth authentication parameter from the fourth message; and where the determining, by the first authentication device, whether the authentication is successful according to the first signal feature information and the second signal feature information includes: comparing, by the first authentication device, the third authentication parameter and the fourth authentication parameter; determining, by the first authentication device, the authentication is successful when the fourth authentication parameter and the third authentication parameter are equal.

According to the embodiment of the present disclosure, a third authentication parameter is determined according to the refined first bit string, if the fourth authentication parameter and the third authentication parameter are equal, then the authentication is successful, so the mutual authentication between the first authentication device and the second authentication device is realized, thereby the relay attack can be efficiently detected and avoided accurately.

In a possible implementation form of the authentication according to the first aspect as such, before the obtaining, by the first authentication device, the first signal feature information set by sampling multiple first wireless signals on multiple channels involved in the channel hopping, the method further includes: receiving, by the first authentication device, a fourth message from the second authentication device, where the fourth message includes a channel sequence randomly generated by the second authentication device and a time parameter for indicating a wait period on each channel involved in the channel hopping, the channel sequence and the time parameter are encrypted according to the first key, and the fourth message further includes a fourth message authentication code calculated for the channel sequence and the time parameter using the first key or information about signing the channel sequence and the time parameter with the private key of the second authentication device; extracting, by the first authentication device, the channel sequence and the time parameter from the fourth message; and where the obtaining, by the first authentication device, a first signal feature information set by sampling multiple first wireless signals on multiple channels involved in a channel hopping includes: obtaining, by the first authentication device, the first signal feature information set by sampling the multiple first wireless signals on the multiple channels involved in the channel hopping started from the extracted channel sequence every first period, where the first period is the time parameter plus a second period, and the second period is a period starting from hopping onto a new channel to obtaining the first signal feature information.

According to the embodiment of the present disclosure, the channel sequence is randomly generated by the second authentication device, the channel sequence and a time parameter are encrypted according to a first key associated with the second authentication device, which secures the channel hopping, and the first signal feature information on each channel involved in a channel hopping can be recorded as a first signal feature information set to increase the reliability of the first signal feature information.

According to the embodiment of the present disclosure, the first authentication device obtains the first signal feature information set by sampling the multiple first wireless signals on the multiple channels involved in the channel hopping started from the extracted channel sequence every first period, which secures the channel hopping.

In a possible implementation form of the authentication according to the first aspect as such, before the obtaining, by a first authentication device, first signal feature information by sampling the first wireless signal sent by the second authentication device, the method further includes: receiving, by the first authentication device, a start message from the second authentication device, where the start message includes an identification number of the second authentication device and a ninth message authentication code calculated for the identification number using the first key, or, where the start message includes an identification number of the second authentication device encrypted according to a public key of the first authentication device and information about signing the identification number using the private key of the second authentication device; extracting, by the first authentication device, the first key according to the identification number and a stored correspondence between the first key and the identification number; and transmitting, by the first authentication device, a response message including a freshness nonce to the second authentication device, where the freshness nonce is an arbitrary bit string, where the freshness nonce is encrypted according to the first key, and the response message further includes a tenth message authentication code calculated for the freshness nonce using the first key or information about signing the freshness nonce with the private key of the second authentication device.

According to the embodiment of the present disclosure, the first authentication device extracts the first key according to the identification number and a stored correspondence between the first key and the identification number.

A second aspect of the present disclosure relates to an authentication method, including: obtaining, by a second authentication device, second signal feature information by sampling a second wireless signal sent by a first authentication device, where the second signal feature information is used to indicate a feature of the second wireless signal; transmitting, by the second authentication device, the second signal feature information to the first authentication device; and receiving, by the second authentication device, an authentication result from the first authentication device, where the authentication result is determined by the first authentication device according to the first signal feature information and the second signal feature information.

A third aspect of the present disclosure relates to a first authentication device, including: an obtaining module, configured to obtain first signal feature information by sampling a first wireless signal sent by a second authentication device, where the first signal feature information is used to indicate a feature of the first wireless signal; a receiving module, configured to receive second signal feature information from the second authentication device, where the second signal feature information is obtained by the second authentication device by sampling a second wireless signal sent by the first authentication device, where the second signal feature information is used to indicate a feature of the second wireless signal; and a processing module, configured to determine whether the authentication is successful according to the first signal feature information and the second signal feature information.

A fourth aspect of the present disclosure relates to a second authentication device, including: an obtaining module, configured to obtain a second signal feature information by sampling a second wireless signal sent by a first authentication device, where the second signal feature information is used to indicate a feature of the second wireless signal; a transmitting module, configured to transmit the second signal feature information to the first authentication device; and a receiving module, configured to receive an authentication result from the first authentication device, where the authentication result is determined by the first authentication device according to the first signal feature information and the second signal feature information.

A fifth aspect of the present disclosure relates to a first authentication device, including a processor and a memory having executable instructions stored thereon that when executed by the processor cause the processor to implement the method in the above-mentioned first aspect or any possible implementation of the first aspect.

A sixth aspect of the present disclosure relates to a second authentication device, including a processor and a memory having executable instructions stored thereon that when executed by the processor cause the processor to implement the method in the above-mentioned second aspect or any possible implementation of the second aspect.

A seventh aspect of the present disclosure relates to a computer storage medium storing computer executable instructions which, when being executed, implement the method in the above-mentioned first aspect or any possible implementation of the first aspect.

An eight aspect of the present disclosure relates to a computer storage medium storing computer executable instructions which, when being executed, implement the method in the above-mentioned second aspect or any possible implementation of the second aspect.

A ninth aspect of the present disclosure relates to a vehicle, including the first authentication device according to the above-mentioned third aspect or any possible implementation of the third aspect.

A tenth aspect of the present disclosure relates to a user's device, including the second authentication device according to the above-mentioned forth aspect or any possible implementation of the forth aspect.

An eleventh aspect of the present disclosure relates to an authentication system, including the vehicle according to the above-mentioned ninth aspect or any possible implementation of the ninth aspect and the user's device according to the above-mentioned tenth aspect or any possible implementation of the tenth aspect.

DESCRIPTION OF EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and include structural or logical changes not depicted in the figures. The following detailed description, therefore, is not to be taken in a limiting sense, and the scope of the present disclosure is defined by the appended claims.

Figure 1:
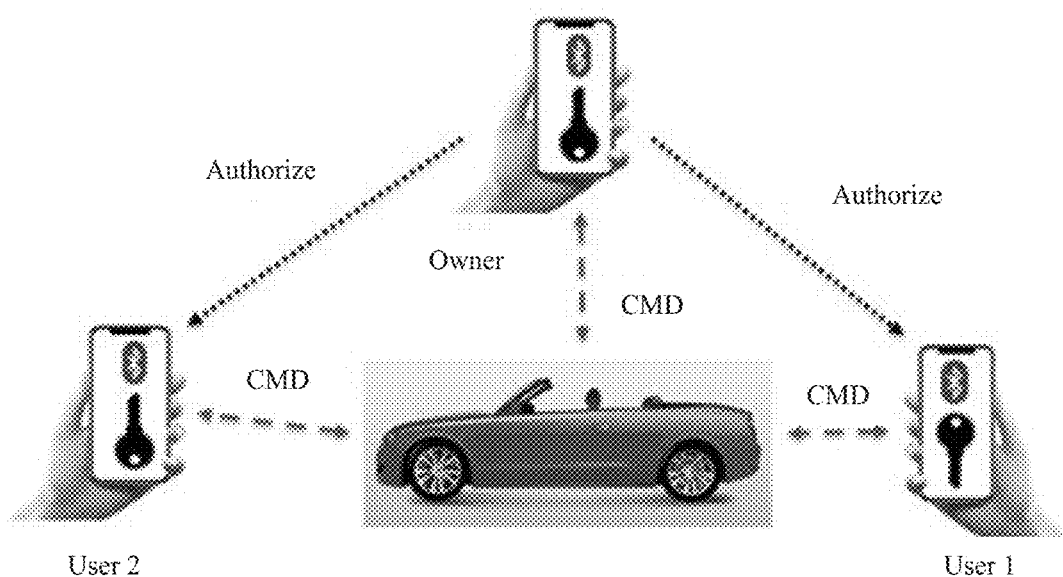
FIG. 1 is a schematic scenario diagram of digital key solution and passive keyless entry systems for vehicles in related art.

FIG. 1 is a schematic scenario diagram of digital key solution and passive keyless entry systems for vehicles in related art. As can been seen in FIG. 1, multiple users can be authorized by the vehicle's owner to use his or her vehicle. These systems use a mobile phone, which is provided to the user by a trusted entity at the time of user registration, to establish wireless connection with the vehicle.

The current solutions for keyless entry systems are vulnerable for relay attack and other active attack which is serious issue. Some of the existing solutions use distance estimation methods to calculate the distance between the wireless devices, such as user's device and the vehicle using signal features, if the user's device is found to be in the range, then the vehicle accepts the commands.

The user device, which may also be referred to as a terminal device, a terminal station or user equipment, may be any one of the following devices: a smartphone, a mobile phone, a cellular phone, a cordless phone, a session initiation protocol (SIP) phone, a wireless local loop (WLL) station, a personal digital assistant (PDA), a handheld device capable of wireless communication, an on-board equipment, a wearable device, a computing device or other processing devices connecting to a wireless modem.

In general, Bluetooth wireless technology is a wireless communications system intended to replace the cables connecting electronic devices. Bluetooth Low Energy (BLE) technology is used to communicate between the vehicle and the user's device. BLE wireless technology includes ultra-low peak, average and idle power consumption, and ability to run for years on standard coin-cell batteries, low cost, multi-vendor interoperability and enhanced range.

The KES solutions facilitate the users to open and start the wireless device, such as the vehicle, while the physical key is in their pockets. The digital keys is another solution where the user's personal wireless device e.g., mobile phone will have an authorized "digital key" store, and the mobile phone can communicate with the vehicle using Bluetooth wireless technology. In both the above scenarios, the user's device, such as the key or the mobile phone sends commands to the vehicle when it is in the communication range of the vehicle. In order to detect the proximity of the user, the existing solutions is provided to measure the wireless signal strength, specifically, a strong signal indicates that the communication between the vehicle and key or the mobile phone are very near, that is the user's device is in the range; while a wake signal indicates that the communication between the vehicle and the mobile phone are very far, that is the user's device out of the range. And thus the vehicle accepts the commands sent by the nearby user's devices or a key whose signal strength is above certain threshold.

Figure 2:
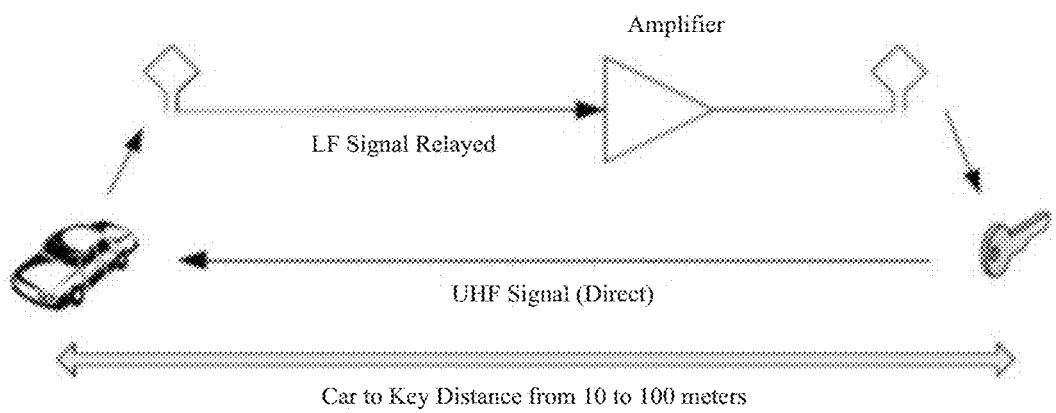
FIG. 2 is a schematic scenario diagram of relay attack in related art.

Many of the existing KES solutions suffer from active attacks like replay and relay attacks. In relay attacks, an attacker can relay the command messages between the vehicle and key or user's device even if they are far away or outside their communication range. FIG. 2 is a schematic scenario diagram of relay attack in related art. As can be seen in FIG. 2, the attacker's device communicates with the real key or user's device impersonating as a vehicle, specifically, it sends the commands or messages sent by the vehicle for finding the user's device in its range. When the real key or user's device listens to this message sent by attacker's device, it responds to the message with signal assuming that it is the user's legitimate or own vehicle. The attacker then captures or records the signal from the actual key or user's device, and then amplifies and transmits to vehicle. The vehicle receives the signal sent by the attacker's device, and interprets them as commands sent by original key or user's device. Thus, the attacker can easily unlock and steal the vehicle. Similarly, the attacker can also record and replay the messages in signal between vehicle and key or user's device to unlock and steal the vehicle. These are some of the most serious threats to KES, and thus, the security of KES solutions is very important to prevent such attacks.

The security threat of keyless entry systems not limited to the above mentioned, another serious security threat that has been reported on the latest BLE 5.0 stack is session hijacking and jamming attack. Recent study has demonstrated that the BLE stack version above 5.0 is vulnerable to this threat. BLE wireless devices use multiple channels for data transmission upon connection establishment. They employ frequency or channel hopping mechanism to hop to another channel. In order to synchronize their channel hopping, the two communicating BLE wireless devices derive the next channel using a part of the packet information that is exchanged over the air. Attacker can sniff these packets content and learn about the channel hoping pattern, and thus can jam these channels, or hijack the session.

Therefore, the secure proximity verification and mutual authentication is essential and the channel hopping must be made secure, the problem for the security threat of the keyless entry systems by the attacker must be urgently resolved.

Figure 3:
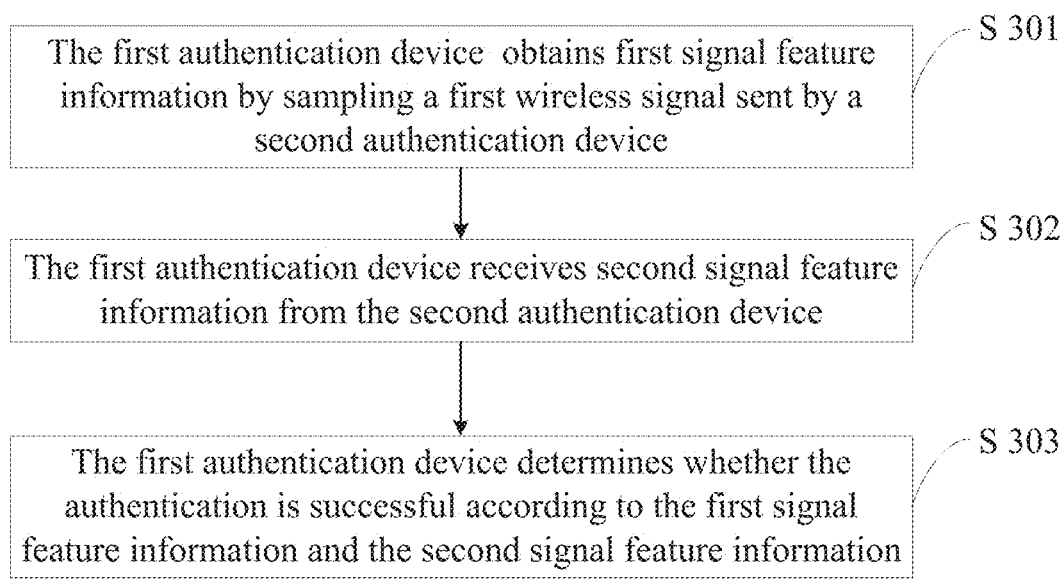
FIG. 3 is a schematic flowchart of an authentication method according to an embodiment of the present disclosure.

At least one embodiment of the present disclosure provides an authentication method. The method may be executed by a first authentication device. FIG. 3 is a schematic flowchart of an authentication method according to an embodiment of the present disclosure. As illustrated in FIG. 3, the authentication method may include the following steps 301 to 303.

S301: the first authentication device obtains first signal feature information by sampling a first wireless signal sent by a second authentication device.

The first signal feature information is used to indicate a feature of the first wireless signal. For example, when BLE technology is used to communicate between the first authentication device and the second authentication device, the signal feature information can be received signal strength (RSS) or a received signal strength indicator (RSSI), and when Zigbee (IEEE 802.15.4) technology is used to communicate between the first authentication device and the second authentication device, the signal feature information can be a link quality indicator (LQI), and the first authentication device can be a vehicle, and the second authentication device can be a user's device communicated with the vehicle.

S302: the first authentication device receives second signal feature information from the second authentication device.

The second signal feature information is obtained by the second authentication device by sampling a second wireless signal sent by the first authentication device, and the second signal feature information is used to indicate a feature of the second wireless signal.

S303: the first authentication device determines whether the authentication is successful according to the first signal feature information and the second signal feature information.

In this embodiment, due to the signal propagation in surrounding environment, the signal feature information recorded by two legitimate devices (e.g. device A and device B) that are in the vicinity of each other and directly communicating with each other (without any relay device between them) will be highly similar. The signal feature information is used for mutual authentication and proximity verification in turn. If there is a relay device (e.g., device R between A and B), then the signal feature information recorded by two legitimate devices A and B will never be highly similar because the signal is relayed by device R between them. The path taken by the wireless signal from relay device R to device A and relay device R to device B will be different. Hence, the signal feature information recorded by device A and device B cannot be highly similar.

In an embodiment, the first authentication device may determine a similarity between the first signal feature information and the second signal feature information, and determine the authentication is successful when the similarity meets a threshold.

According to the embodiment of the present disclosure, the first authentication device obtains first signal feature information by sampling a first wireless signal sent by a second authentication device, receives second signal feature information from the second authentication device, and determines whether the authentication is successful according to the first signal feature information and the second signal feature information, due to reciprocity property of the wireless channel, if the first signal feature information and the second signal feature information show high correlation, then the authentication is successful, so the mutual authentication between the first authentication device and the second authentication device is realized, thereby the relay attack can be efficiently detected and avoided.

In an embodiment, S302 may be that the first authentication device receives a first message including the second signal feature information, where the second signal feature information is encrypted according to a first key associated with the second authentication device, and the first message further includes a first message authentication code calculated for the second signal feature information using the first key or information about signing the second signal feature information with a private key of the second authentication device.

According to this embodiment of the present disclosure, the second signal feature information is encrypted according to a first key associated with the second authentication device, and the first message further includes a first message authentication code calculated for the second signal feature information using the first key or information about signing the second signal feature information with a private key of the second authentication device, which secures the second signal feature information.

Figure 4:
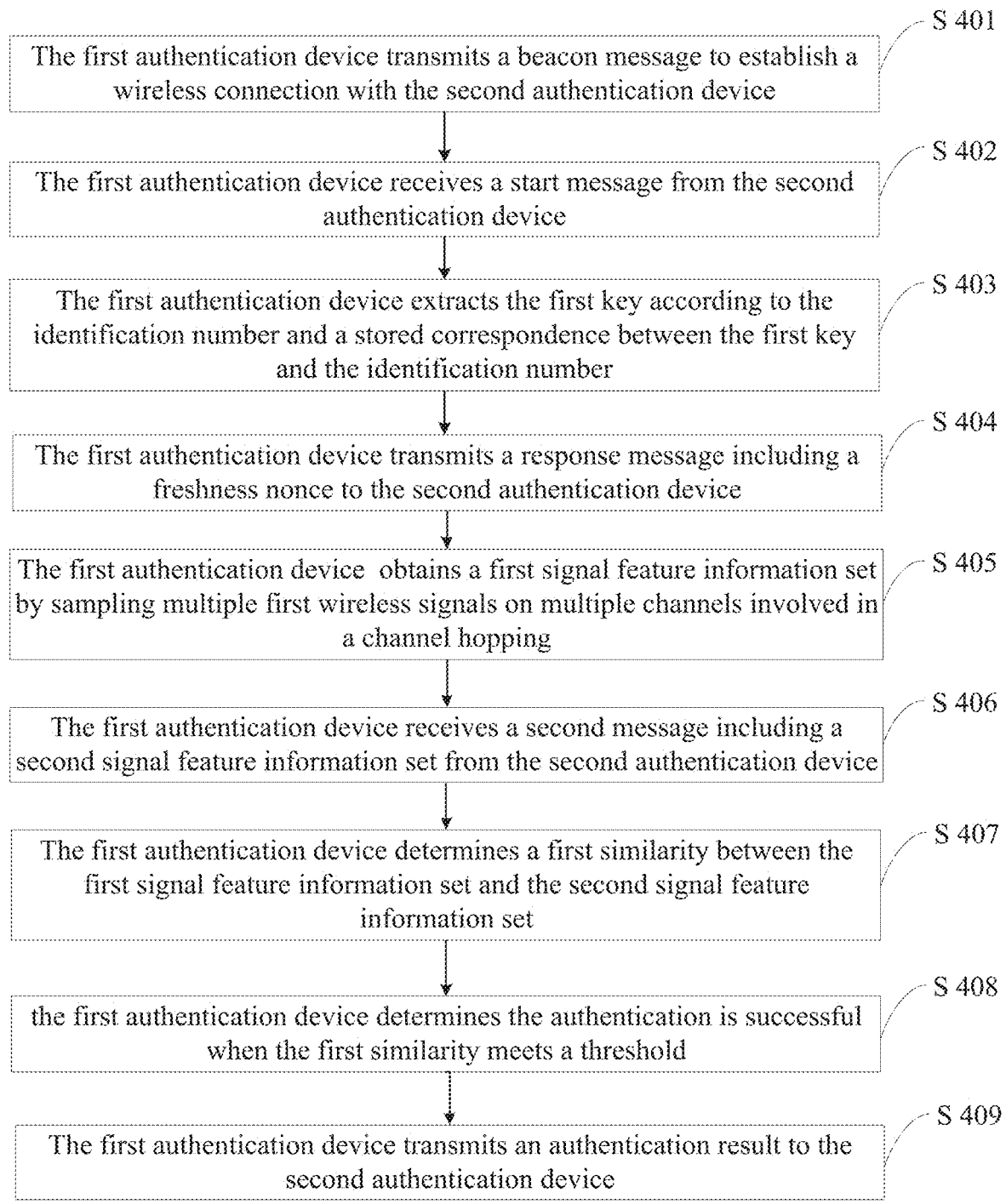
FIG. 4 is a schematic flowchart of an authentication method according to another embodiment of the present disclosure.

At least one embodiment of the present disclosure provides an authentication method. The method may be executed by a first authentication device. FIG. 4 is a schematic flowchart of an authentication method according to another embodiment of the present disclosure. As illustrated in FIG. 4, the authentication method may include the following steps 401 to 409.

S401: the first authentication device transmits a beacon message to the second authentication device to establish a wireless connection with the second authentication device.

For example, the first authentication device transmits the beacon message to the second authentication device in periodicity to establish a wireless connection with the second authentication device using a connection key. The connection key is shared between the first authentication device and the second authentication device and configured by the trusted entity e.g., cloud service, which is used for wireless connection establishment and for encrypting the wireless communication.

S402: the first authentication device receives a start message from the second authentication device.

The start message includes an identification number of the second authentication device and a ninth message authentication code calculated for the identification number using the first key. In a possible implementation, the start message includes an identification number of the second authentication device encrypted according to a public key of the first authentication device and information about signing the identification number using the private key of the second authentication device.

The first key is shared between the first authentication device and the second authentication device and configured by the trusted entity e.g., cloud service, which is unique and bound to the first authentication device and is non-transferable, and the first key is used for encrypting the command or data in wireless signal packets for enhanced security, and making the start message do not leak any identification number information during the mutual authentication. In a possible implementation, the identification number of the second authentication device is configured by the trusted entity e.g., cloud service during registration. In a possible implementation, the identification number of the second authentication device is unique based on the second authentication device and is non-transferrable and bound to the second authentication device.

S403: the first authentication device extracts the first key according to the identification number and a stored correspondence between the first key and the identification number.

For example, the stored correspondence may be a table recorded the correspondence relationship between the first key and the identification number, and the first authentication device extracts the first key from the start message, based on the extracted identification number and the correspondence relationship between the first key and the identification number, the first authentication device obtains the first key.

S404: the first authentication device transmits a response message including a freshness nonce to the second authentication device.

For example, the freshness nonce is an arbitrary bit string and different every period, the freshness nonce is encrypted according to the first key. If the attacker has captured previous session messages and tries to launch a replay attack, the first authentication device can detect it, as the first authentication device can identify this freshness nonce was used last time or sometime before and is not the same as current session's freshness nonce.

In a possible implementation, the response message further includes a tenth message authentication code calculated for the freshness nonce using the first key or information about signing the freshness nonce with the private key of the second authentication device, which secures the freshness nonce, further avoids the replay attack.

S405: the first authentication device obtains a first signal feature information set by sampling multiple first wireless signals on multiple channels involved in a channel hopping.

S406: the first authentication device receives a second message including a second signal feature information set from the second authentication device.

The second signal feature information set is obtained by sampling multiple second wireless signals on multiple channels involved in the channel hopping by the second authentication device, where the second signal feature information set is encrypted according to a first key associated with the second authentication device, where the second message further includes a second message authentication code calculated for the second signal feature information set using the first key or information about signing the second signal feature information set with a private key of the second authentication device.

S407: the first authentication device determines a first similarity between the first signal feature information set and the second signal feature information set.

S408: the first authentication device determines the authentication is successful when the first similarity meets a threshold.

For example, the first similarity may be the difference between the first signal feature information set and the second signal feature information set, if the difference is smaller than a threshold, the authentication is successful; else, the authentication is failed.

S409: the first authentication device transmits an authentication result to the second authentication device.

In an embodiment, the first authentication device may transmit a message with a notation "OK" to the second authentication device if the first similarity meets a threshold, else the first authentication device transmits a message with a notation "FAIL" to the second authentication device.

According to the embodiment of the present disclosure, a first signal feature information set is obtained by sampling multiple first wireless signals on multiple channels involved in a channel hopping, the encrypted second signal feature information set is received from the second authentication device, a first similarity between the first signal feature information set and the second signal feature information set is determined, and the authentication result is obtained according to the first similarity, so an accurate mutual authentication between the first authentication device and the second authentication device is realized, thereby the relay attack can be efficiently detected and avoided.

Figure 5:
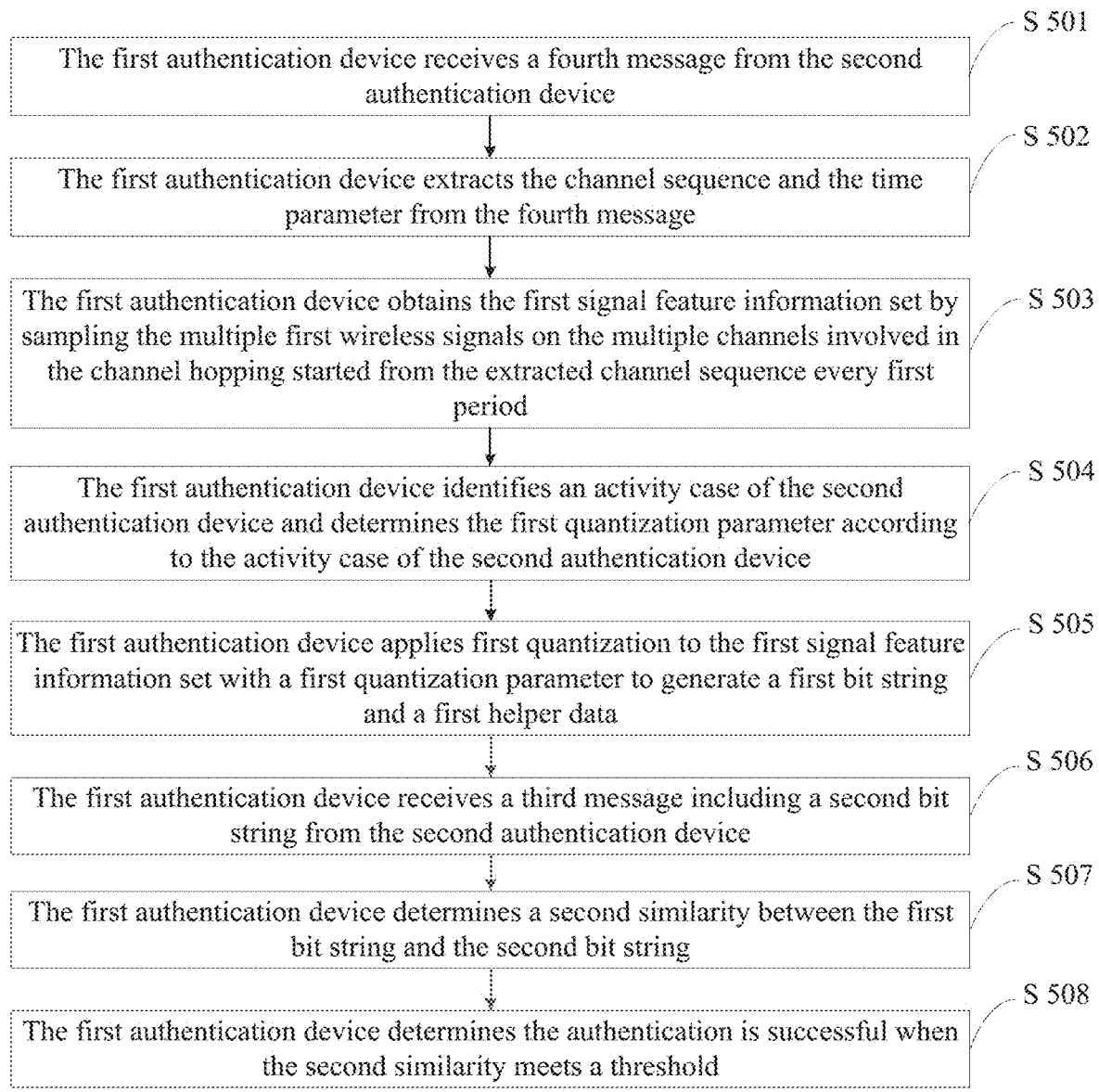
FIG. 5 is a schematic flowchart of an authentication method according to another embodiment of the present disclosure.

At least one embodiment of the present disclosure provides an authentication method. The method may be executed by a first authentication device. Based on the embodiment illustrated in FIG. 4, FIG. 5 is a schematic flowchart of an authentication method according to another embodiment of the present disclosure. As illustrated in FIG. 5, the authentication method may include the following steps 501 to 508.

S501: the first authentication device receives a fourth message from the second authentication device.

The fourth message includes a channel sequence randomly generated by the second authentication device and a time parameter for indicating a wait period on each channel involved in the channel hopping, the channel sequence and the time parameter are encrypted according to the first key, and the fourth message further includes a fourth message authentication code calculated for the channel sequence and the time parameter using the first key or information about signing the channel sequence and the time parameter with the private key of the second authentication device, which secures the channel sequence information during the mutual authentication, further makes the attacker cannot track the channel hopping.

S502: the first authentication device extracts the channel sequence and the time parameter from the fourth message.

In some embodiment, the first authentication device decrypts the first message and extracts the channel sequence and the time parameter from the first message.

In some other embodiment, the channel sequence and the time parameter may be generated by the first authentication device, and transmitted to the second authentication device, which is will not be described herein for brevity.

S503: the first authentication device obtains the first signal feature information set by sampling the multiple first wireless signals on the multiple channels involved in the channel hopping started from the extracted channel sequence every first period.

The first period is the time parameter plus a second period, and the second period is a period starting from hopping onto a new channel to obtaining the first signal feature information.

S504: the first authentication device identifies an activity case of the second authentication device and determines the first quantization parameter according to the activity case of the second authentication device.

The first authentication device may identify whether the second authentication device is moving towers the first authentication device, or is just standing with minimal movement, or at rest (on table), the first quantization parameter may be determined based on the activity case of the second authentication device during authentication. For example, the quantization parameter corresponds to how many bits can be extracted from each first signal feature information etc., that is, more movement of the second authentication device causes more variation in the first signal feature information, which corresponds to more bits and less movement of the second authentication device causes less variation in the first signal feature information, which corresponds to less bits.

S505: the first authentication device applies first quantization to the first signal feature information set with a first quantization parameter to generate a first bit string and a first helper data.

The first helper data is the first signal feature information that is discarded during the first quantization. For example, the first quantization is the Multi-bit quantization, the first authentication device applies the Multi-bit quantization to the first signal feature information set with the first quantization parameter to generate the first bit string and discard some first signal feature information and the index of which form the first helper data.

The first bit string obtained by applying the first quantization to the first signal feature information set is more convenient and accurate for authentication.

S506: the first authentication device receives a third message including a second bit string from the second authentication device.

The second bit string is determined based on second quantization of a second signal feature information set by the second authentication device, the second bit string is encrypted according to the first key, the third message further includes a third message authentication code calculated for the second bit string using the first key or information about signing the second bit string with the private key of the second authentication device, which secures the second bit string during the mutual authentication.

S507: the first authentication device determines a second similarity between the first bit string and the second bit string.

S508: the first authentication device determines the authentication is successful when the second similarity meets a threshold.

For example, the second similarity may be the difference between the first bit string and the second bit string, if the difference is smaller than a threshold, the authentication is successful; else, the authentication is failed.

The first authentication device transmits an authentication result to the second authentication device. For example, the first authentication device transmits a message with a notation "OK" to the second authentication device if the first similarity meets a threshold, or the first authentication device transmits a message with a notation "FAIL" to the second authentication device.

Figure 6:
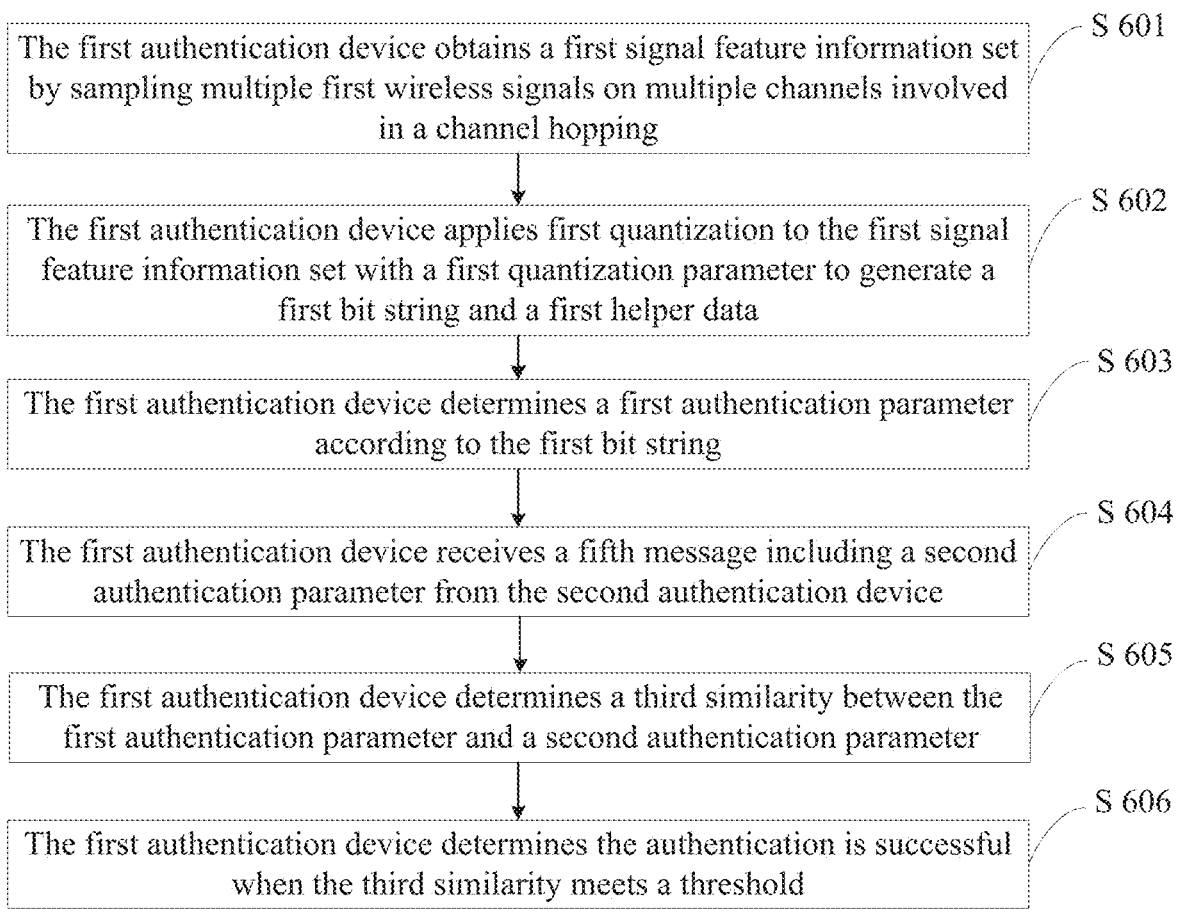
FIG. 6 is a schematic flowchart of an authentication method according to another embodiment of the present disclosure.

According to the embodiment of the present disclosure, the channel sequence and a time parameter are encrypted according to a first key associated with the second authentication device, which secures the channel hopping, and the first signal feature information on each channel involved in a channel hopping can be recorded as a first signal feature information set to increase the reliability of the first signal feature information. The first bit string is obtained by applying first quantization to the first signal feature information set with a first quantization parameter, an encrypted second bit string is received from the second authentication device, a second similarity between the first bit string and the second bit string is determined, and the authentication result is obtained according to the second similarity, so the mutual authentication between the first authentication device and the second authentication device is realized, thereby the relay attack can be efficiently detected and avoided. At least one embodiment of the present disclosure provides an authentication method. The method may be executed by a first authentication device. Based on the embodiment illustrated in FIG. 5, FIG. 6 is a schematic flowchart of an authentication method according to another embodiment of the present disclosure. As illustrated in FIG. 6, the authentication method may include the following steps 601 to 606.

S601: the first authentication device obtains a first signal feature information set by sampling multiple first wireless signals on multiple channels involved in a channel hopping.

S602: the first authentication device applies first quantization to the first signal feature information set with a first quantization parameter to generate a first bit string and a first helper data.

S603: the first authentication device determines a first authentication parameter according to the first bit string.

The first authentication device determines whether the authentication is successful by using the fuzzy commitment scheme, so the first authentication device determines the first authentication parameter based on the first bit string according to the fuzzy commitment scheme. The fuzzy commitment scheme makes the authentication more accurate.

S604: the first authentication device receives a fifth message including a second authentication parameter from the second authentication device.

The second authentication parameter is determined according to a second bit string by the second authentication device, and the second bit string is determined based on second quantization of a second signal feature information set by the second authentication device.

In a possible implementation, the second authentication parameter is encrypted according to the first key. In a possible implementation, the fifth message further includes a fifth message authentication code calculated for the second authentication parameter using the first key or information about signing the second authentication parameter with the private key of the second authentication device, which secures the second authentication parameter during the authentication.

S605: the first authentication device determines a third similarity between the first authentication parameter and a second authentication parameter.

S606: the first authentication device determines the authentication is successful when the third similarity meets a threshold.

For example, the third similarity may be the difference between the first authentication parameter and the second authentication parameter, if the difference is smaller than a threshold, the authentication is successful; else, the authentication is failed. The first authentication device transmits an authentication result to the second authentication device.

According to the embodiment of the present disclosure, a first authentication parameter is determined according to the first bit string, if the third similarity between the first authentication parameter and the second authentication parameter meets a threshold, then the authentication is successful, so the mutual authentication between the first authentication device and the second authentication device is realized, thereby the relay attack can be efficiently detected and avoided. Further, the parameter involved in the authentication is determined by using a fuzzy commitment scheme, thereby the accuracy of the authentication is improved.

Figure 7:
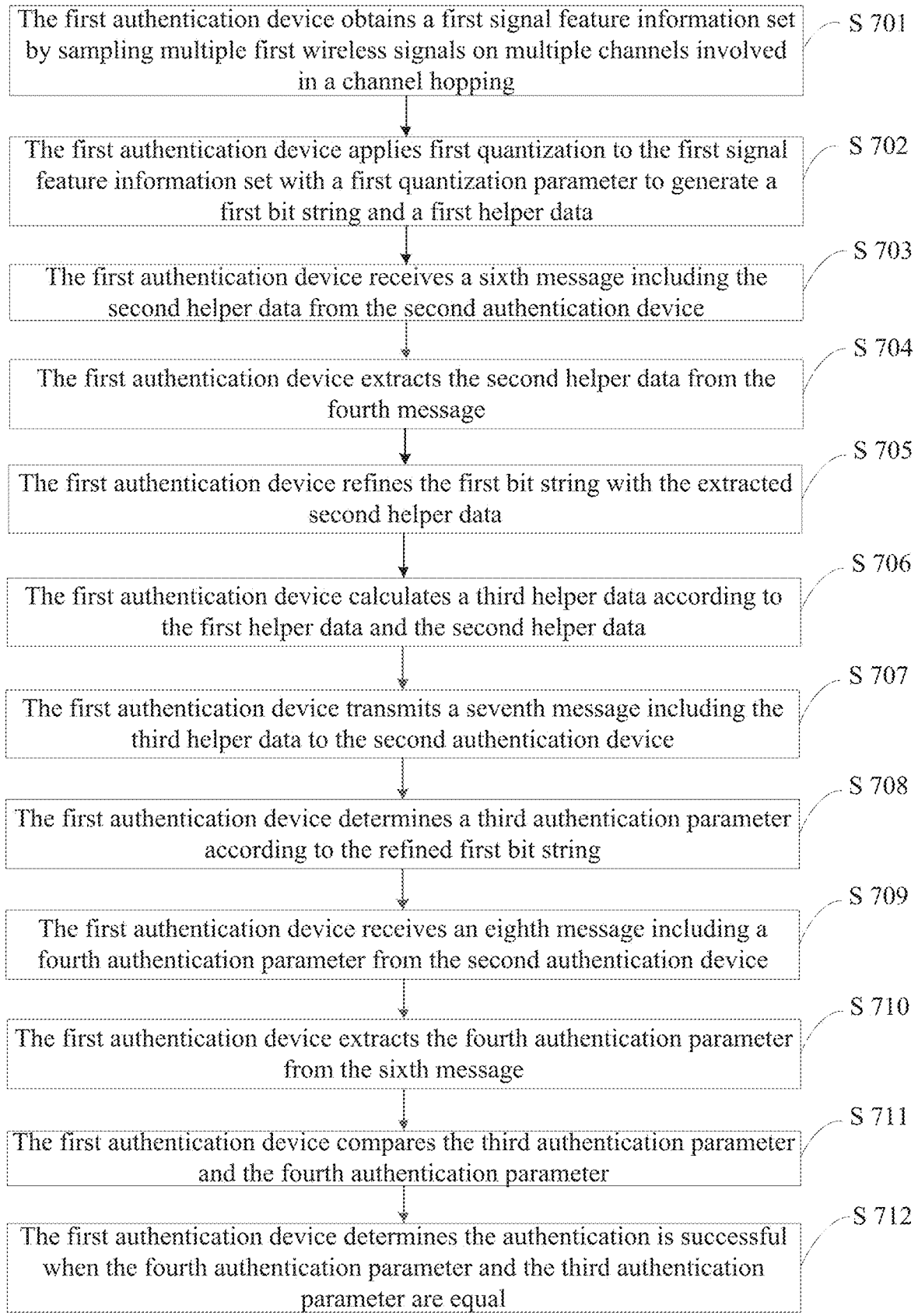
FIG. 7 is a schematic flowchart of an authentication method according to another embodiment of the present disclosure.

At least one embodiment of the present disclosure provides an authentication method. The method may be executed by a first authentication device. Based on the embodiment illustrated in FIG. 6, the first bit string and the second bit string are refined. FIG. 7 is a schematic flowchart of an authentication method according to another embodiment of the present disclosure. As illustrated in FIG. 7, the authentication method may include the following steps 701 to 712.

S701: the first authentication device obtains a first signal feature information set by sampling multiple first wireless signals on multiple channels involved in a channel hopping.

S702: the first authentication device applies first quantization to the first signal feature information set with a first quantization parameter to generate a first bit string and a first helper data.

S703: the first authentication device receives a sixth message including the second helper data from the second authentication device.

The second helper data is encrypted according to the first key, and the second helper data is determined based on the second quantization of the second signal feature information set by the second authentication device, and the second helper data is the second signal feature information that is discarded during the second quantization. In a possible implementation, the sixth message further includes a sixth message authentication code calculated for the second helper data using the first key or information about signing the second helper data with the private key of the second authentication device, which secures the second helper data during authentication.

S704: the first authentication device extracts the second helper data from the fourth message.

For example, the first authentication device decrypts the fourth message and extracts the second helper data from the fourth message.

S705: the first authentication device refines the first bit string with the extracted second helper data.

The list of indexes of the first authentication device discarded during the first quantization is slightly different from the list of indexes of the second authentication device discarded during the second quantization due to effect of the noise and the hardware equipment. The first authentication device refines the first bit string with the second helper data, that is, the first authentication device further discards all the bits in the first bit string that corresponds to items in the second helper data. The refining process can make the first signal feature information set and the second signal feature information set more similar, so the authentication may be more accurate.

S706: the first authentication device calculates a third helper data according to the first helper data and the second helper data.

The first authentication device further discards all the bits in the first bit string that corresponds to items in the second helper data, and has an updated list of first signal feature information indexes that are discarded by the first authentication device and the second authentication device, and the updated list of first signal feature information indexes forms the third helper data.

S707: the first authentication device transmits a seventh message including the third helper data to the second authentication device.

The third helper data is encrypted according to the first key, the seventh message further includes a seventh message authentication code calculated for the third helper data using the first key or information about signing the third helper data with the private key of the second authentication device, which secures the third helper data information during authentication.

S708: the first authentication device determines a third authentication parameter according to the refined first bit string.

The first authentication device determines the third authentication parameter according to the refined first bit string according to the fuzzy commitment scheme. The fuzzy commitment scheme can make the authentication more accurate.

S709: the first authentication device receives an eighth message including a fourth authentication parameter from the second authentication device.

The fourth authentication parameter is determined according to a refined second bit string by the second authentication device, and the fourth authentication parameter is encrypted according to the first key, the refined second bit string is the second bit string refined by the third helper data, the eighth message further includes an eighth message authentication code calculated for the fourth authentication parameter using the first key or information about signing the fourth authentication parameter with a private key of the second authentication device, which secures the fourth authentication parameter information during authentication.

S710: the first authentication device extracts the fourth authentication parameter from the sixth message.

For example, the first authentication device decrypts the sixth message and extracts the fourth authentication parameter from the sixth message.

S711: the first authentication device compares the third authentication parameter and the fourth authentication parameter;

S712: the first authentication device determines the authentication is successful when the fourth authentication parameter and the third authentication parameter are equal.

In an embodiment, the first authentication device transmits an authentication result to the second authentication device.

According to the embodiment of the present disclosure, a third authentication parameter is determined according to the refined first bit string, if the fourth authentication parameter and the third authentication parameter are equal, then the authentication is successful, so the mutual authentication between the first authentication device and the second authentication device is realized, thereby the relay attack can be efficiently detected and avoided. Further, the first authentication device refines the first bit string with the extracted second helper data, and determines a third authentication parameter according to the refined first bit string by using the fuzzy commitment scheme, thereby the accuracy of the authentication is improved.

It should be understood, in the above mentioned implementations, in a possible implementation, the wireless connection may be BLE connection, and the first signal feature information may be RSS; in another possible implementation, the wireless connection may be Zigbee connection, and the first signal feature information may be LQI. However, the wireless connection in embodiments of the present disclosure is not limited to the above wireless connection, which will not be described herein for brevity.

Figure 8:
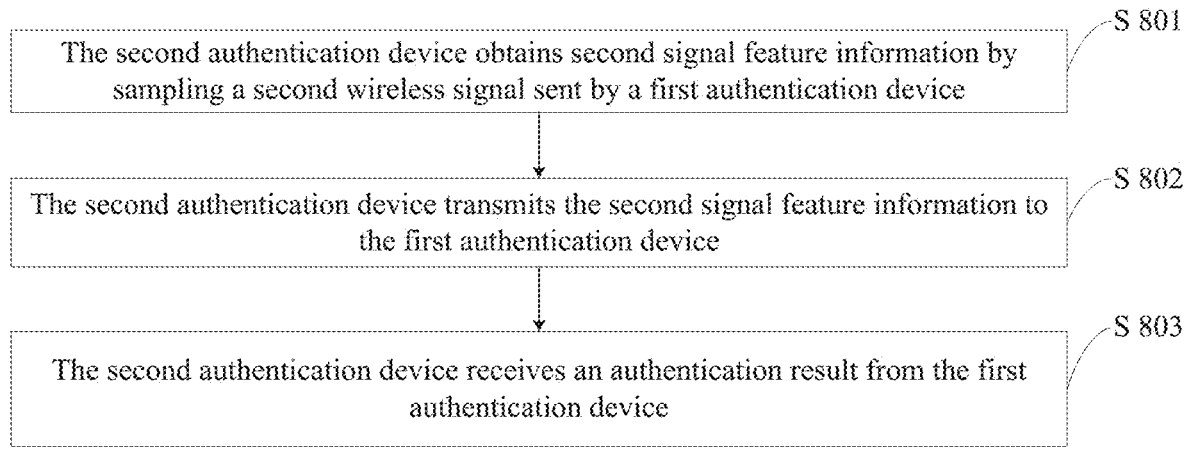
FIG. 8 is a schematic flowchart of an authentication method according to an embodiment of the present disclosure.

At least one embodiment of the present disclosure provides an authentication method. The method may be executed by a second authentication device. FIG. 8 is a schematic flowchart of an authentication method according to an embodiment of the present disclosure. As illustrated in FIG. 8, the authentication method may include the following steps 801 to 803.

S801: the second authentication device obtains second signal feature information by sampling a second wireless signal sent by a first authentication device.

The second signal feature information is used to indicate a feature of the second wireless signal.

S802: the second authentication device transmits the second signal feature information to the first authentication device.

S803: the second authentication device receives an authentication result from the first authentication device.

The authentication result is determined by the first authentication device according to the first signal feature information and the second signal feature information.

According to the embodiment of the present disclosure, the second authentication device obtains the second signal feature information by sampling a second wireless signal sent by a first authentication device, transmits the second signal feature information to the first authentication device, and receives an authentication result from the first authentication device, which is determined according to the first signal feature information and the second signal feature information, due to reciprocity property of the wireless channel, if the first signal feature information and the second signal feature information show high correlation, then the authentication is successful, so the mutual authentication between the first authentication device and the second authentication device is realized, thereby the relay attack can be efficiently detected and avoided.

In an embodiment, S802 may be that the second authentication device transmits a first message including the second signal feature information to the first authentication device, where the second signal feature information is encrypted according to a first key associated with the second authentication device, and the first message further includes a first message authentication code calculated for the second signal feature information using the first key or information about signing the second signal feature information with a private key of the second authentication device.

Figure 9:
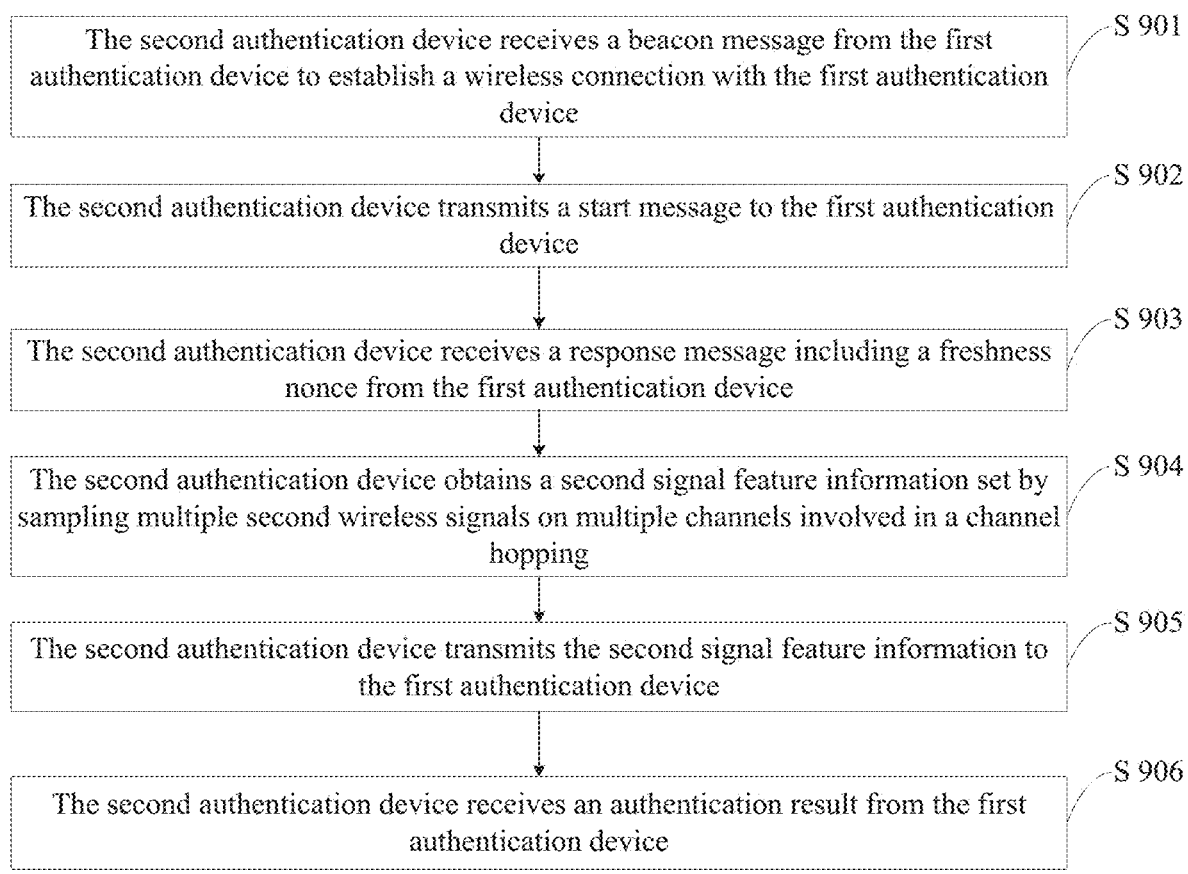
FIG. 9 is a schematic flowchart of an authentication method according to an embodiment of the present disclosure.

At least one embodiment of the present disclosure provides an authentication method. The method may be executed by a second authentication device. FIG. 9 is a schematic flowchart of an authentication method according to an embodiment of the present disclosure. As illustrated in FIG. 9, the authentication method may include the following steps 901 to 906.

S901: the second authentication device receives a beacon message from the first authentication device to establish a wireless connection with the first authentication device.

S902: the second authentication device transmits a start message to the first authentication device.

S903: the second authentication device receives a response message including a freshness nonce from the first authentication device.

S904: the second authentication device obtains a second signal feature information set by sampling multiple second wireless signals on multiple channels involved in a channel hopping.

S905: the second authentication device transmits the second signal feature information to the first authentication device.

S906: the second authentication device receives an authentication result from the first authentication device.

According to the embodiment of the present disclosure, the second authentication device obtains the second signal feature information set by sampling multiple second wireless signals on multiple channels involved in a channel hopping, transmits the second signal feature information to the first authentication device, and receives an authentication result from the first authentication device, which is determined according to the first signal feature information and the second signal feature information, due to reciprocity property of the wireless channel, if the first similarity between the first signal feature information and the second signal feature information meets a threshold, then the authentication is successful, so the mutual authentication between the first authentication device and the second authentication device is realized, thereby the relay attack can be efficiently detected and avoided. Further, the first key and the freshness nonce are communicated between the first authentication device and the second authentication device, the replay attack can also be avoided.

Figure 10:
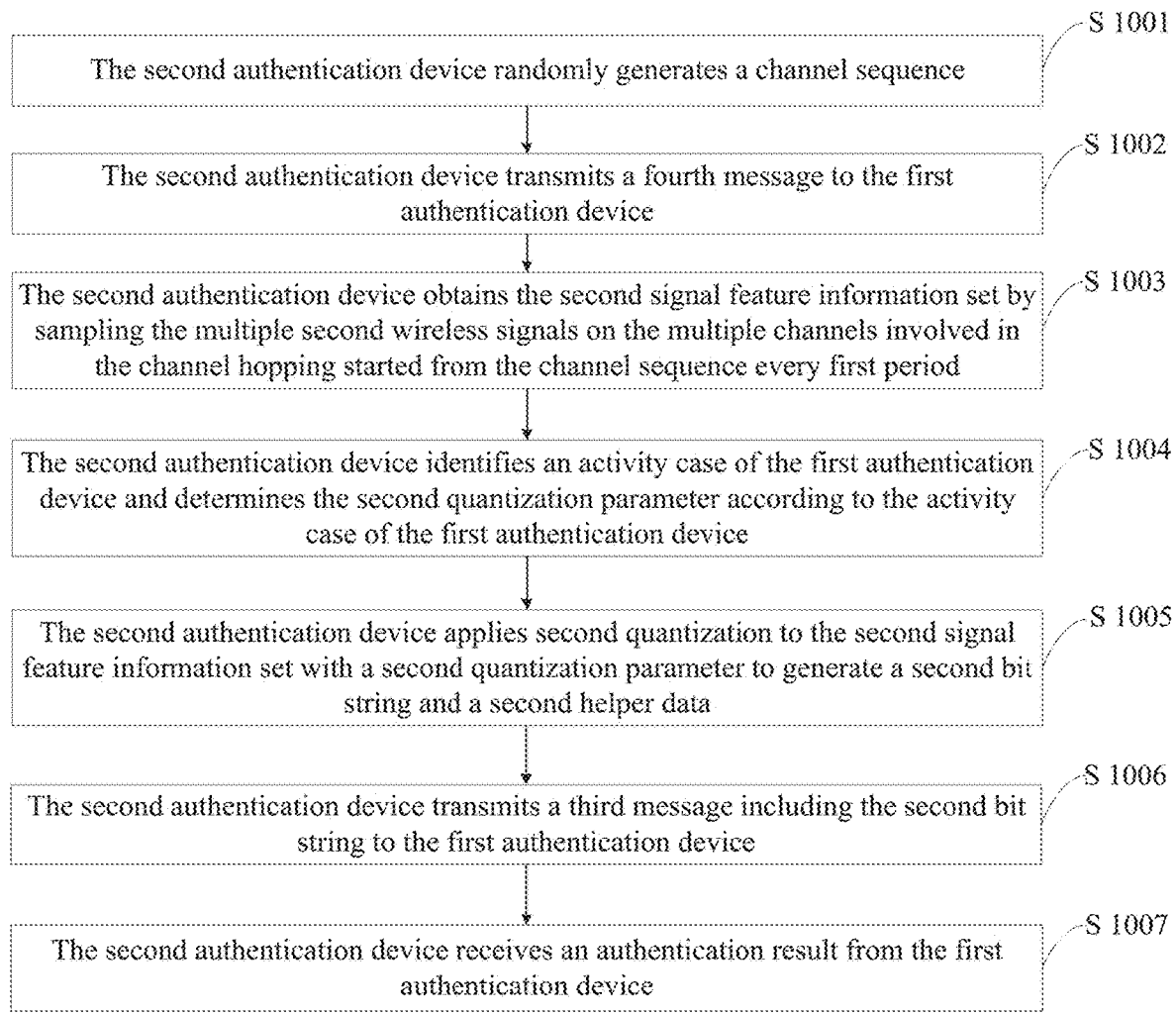
FIG. 10 is a schematic flowchart of an authentication method according to an embodiment of the present disclosure.

At least one embodiment of the present disclosure provides an authentication method. The method may be executed by a second authentication device. Based on the embodiment illustrated in FIG. 9, FIG. 10 is a schematic flowchart of an authentication method according to an embodiment of the present disclosure. As illustrated in FIG. 10, the authentication method may include the following steps 1001 to 1007.

S1001: the second authentication device randomly generates a channel sequence.

The channel sequence is the channel list of the channel hopping according to the channel sequence can change in each period.

S1002: the second authentication device transmits a fourth message to the first authentication device.

S1003: the second authentication device obtains the second signal feature information set by sampling the multiple second wireless signals on the multiple channels involved in the channel hopping started from the channel sequence every first period.

The first period is the time parameter plus a second period, and the second period is a period starting from hopping onto a new channel to obtaining the first signal feature information.

S1004: the second authentication device identifies an activity case of the first authentication device and determines the second quantization parameter according to the activity case of the first authentication device.

The second authentication device may identify whether the first authentication device is moving towers the second authentication device, or is just standing with minimal movement, or at rest, the second quantization parameter may be determined based on the activity case of the first authentication device during the authentication. For example, the quantization parameter corresponds to how many bits can be extracted from each second signal feature information value etc., that is, more movement of the second authentication device causes more variation in the second signal feature information value, which corresponds to more bits and less movement of the second authentication device causes less variation in the second signal feature information value, which corresponds to less bits.

S1005: the second authentication device applies second quantization to the second signal feature information set with a second quantization parameter to generate a second bit string and a second helper data.

The second helper data is the second signal feature information that is discarded during the second quantization. For example, the second quantization is the Multi-bit quantization, the second authentication device applies the Multi-bit quantization to the second signal feature information set with the second quantization parameter to generate the second bit string and discard some second signal feature information and the index of which form the second helper data.

The second bit string obtained by applying the second quantization to the second signal feature information set is more convenient and accurate for authentication.

S1006: the second authentication device transmits a third message including the second bit string to the first authentication device.

S1007: the second authentication device receives an authentication result from the first authentication device.

According to the embodiment of the present disclosure, the channel sequence and a time parameter are encrypted according to a first key associated with the second authentication device, which secures the channel hopping, and the first signal feature information on each channel involved in a channel hopping can be recorded as a first signal feature information set to increase the reliability of the first signal feature information. The first bit string is obtained by applying first quantization to the first signal feature information set with a first quantization parameter, an encrypted second bit string is received from the second authentication device, a second similarity between the first bit string and the second bit string is determined, and the authentication result is obtained according to the second similarity, so the mutual authentication between the first authentication device and the second authentication device is realized, thereby the relay attack can be efficiently detected and avoided.

Figure 11:
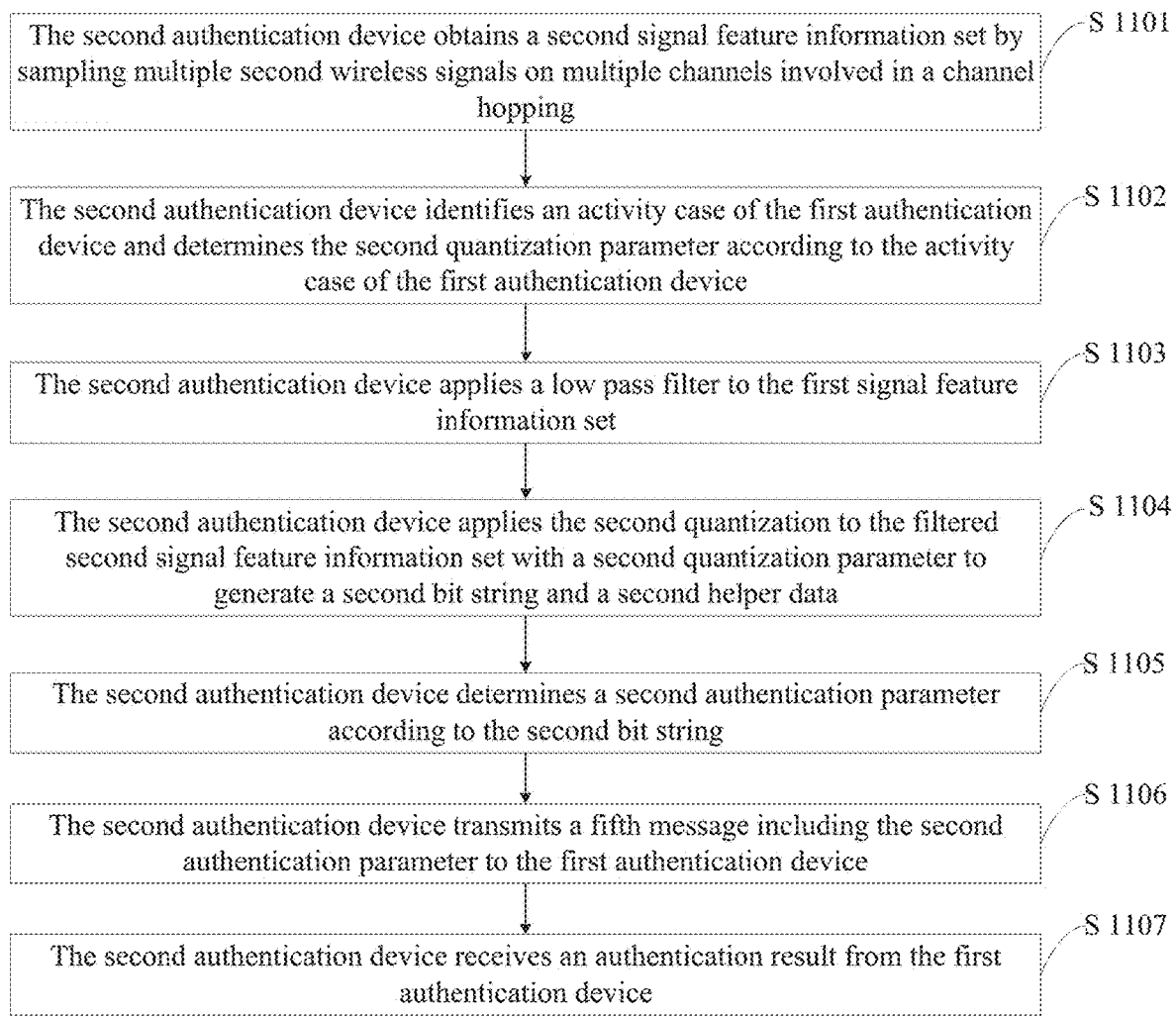
FIG. 11 is a schematic flowchart of an authentication method according to an embodiment of the present disclosure.

At least one embodiment of the present disclosure provides an authentication method. The method may be executed by a second authentication device. Based on the embodiment illustrated in FIG. 10, FIG. 11 is a schematic flowchart of an authentication method according to an embodiment of the present disclosure. As illustrated in FIG. 11, the authentication method may include the following steps 1101 to 1107.

S1101: the second authentication device obtains a second signal feature information set by sampling multiple second wireless signals on multiple channels involved in a channel hopping.

S1102: the second authentication device identifies an activity case of the first authentication device and determines the second quantization parameter according to the activity case of the first authentication device.

S1103: the second authentication device applies a low pass filter to the first signal feature information set.

The second authentication device applies the low pass filter to the second signal feature information set to remove noise. For example, the low pass filter can be Savitzky Golay filter, which can be applied to remove noise components of sudden spikes etc, making the wireless signal curve or plot look smooth.

S1104: the second authentication device applies the second quantization to the filtered second signal feature information set with a second quantization parameter to generate a second bit string and a second helper data.

S1105: the second authentication device determines a second authentication parameter according to the second bit string.

In a possible implementation, the second authentication device determines whether the authentication is successful by using the fuzzy commitment scheme, so the second authentication device determines the second authentication parameter based on the second bit string according to the fuzzy commitment scheme. The fuzzy commitment scheme makes the authentication more accurate.

S1106: the second authentication device transmits a fifth message including the second authentication parameter to the first authentication device.

The second authentication parameter is determined according to a second bit string by the second authentication device, and the second bit string is determined based on second quantization of second signal feature information set by the second authentication device.

The second authentication parameter is encrypted according to the first key, the fifth message further includes a fifth message authentication code calculated for the second authentication parameter using the first key or information about signing the second authentication parameter with the private key of the second authentication device, making the third message do not leak the second authentication parameter information during authentication, further making the attacker cannot track the mutual authentication.

S1107: the second authentication device receives an authentication result from the first authentication device.

The authentication result is determined by the first authentication device according to the first authentication parameter generated by the first authentication device and the second authentication parameter.

According to the embodiment of the present disclosure, a first authentication parameter is determined according to the first bit string, if the third similarity between the first authentication parameter and the second authentication parameter meets a threshold, then the authentication is successful, so the mutual authentication between the first authentication device and the second authentication device is realized, thereby the relay attack can be efficiently detected and avoided. Further, the parameter involved in the authentication is determined by using a fuzzy commitment scheme, thereby the accuracy of the authentication is improved.

Figure 12:
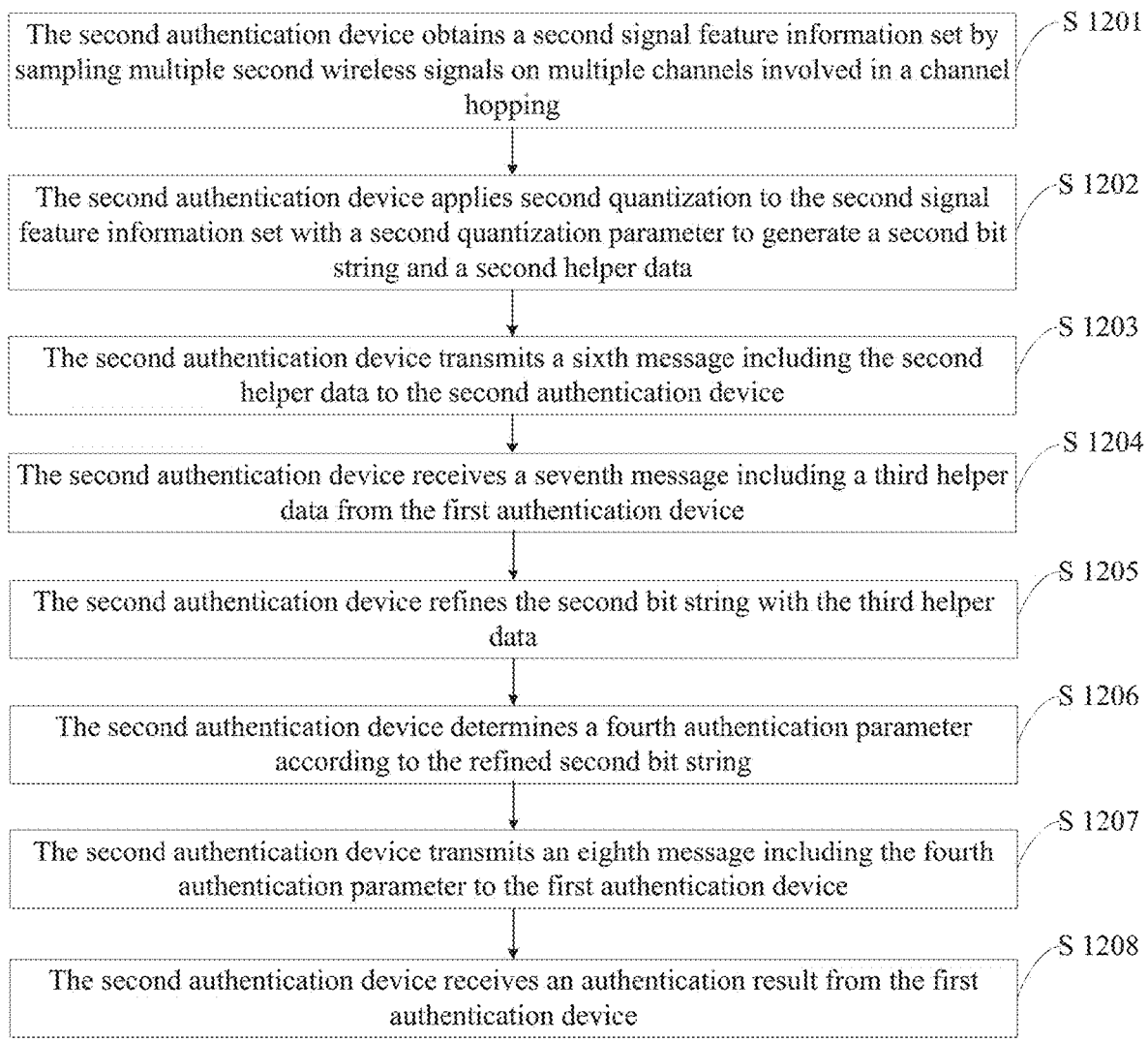
FIG. 12 is a schematic flowchart of an authentication method according to an embodiment of the present disclosure.

At least one embodiment of the present disclosure provides an authentication method. The method may be executed by a second authentication device. Based on the embodiment illustrated in FIG. 11, the first bit string and the second bit are refined. FIG. 12 is a schematic flowchart of an authentication method according to an embodiment of the present disclosure. As illustrated in FIG. 12, the authentication method may include the following steps 1201 to 1208.

S1201: the second authentication device obtains a second signal feature information set by sampling multiple second wireless signals on multiple channels involved in a channel hopping.

S1202: the second authentication device applies second quantization to the second signal feature information set with a second quantization parameter to generate a second bit string and a second helper data.

The second helper data is the second signal feature information that is discarded during the second quantization.

S1203: the first authentication device transmits a sixth message including the second helper data to the second authentication device.

The second helper data is encrypted according to the first key, and the second helper data is determined based on the second quantization of the second signal feature information set by the second authentication device, and the second helper data is the second signal feature information that is discarded during the second quantization. In a possible implementation, the sixth message further includes a sixth message authentication code calculated for the second helper data using the first key or information about signing the second helper data with the private key of the second authentication device.

S1204: the second authentication device receives a seventh message including a third helper data from the first authentication device.

The third helper data is calculated according to a first helper data and the second helper data by the first authentication device, and the first helper data is the first signal feature information that is discarded during a first quantization of the first signal feature information set by the first authentication device. The third helper data is encrypted according to the first key. In a possible implementation, the seventh message further includes a seventh message authentication code calculated for the third helper data using the first key or information about signing the third helper data with the private key of the second authentication device.

S1205: the second authentication device refines the second bit string with the third helper data.

The list of indexes of the first authentication device discarded during the first quantization is slightly different from the list of indexes of the second authentication device discarded during the second quantization due to effect of the noise and the hardware equipment. The second authentication device refines the second bit string by discarding further bits corresponding to items in the third helper data. At the end of refine process, the first bit string and the second bit string should be similar (if the first authentication device and the second authentication device communicate directly and no relay attack). The refine process can make the first signal feature information set and the second signal feature information set more similar, so the authentication may be more accurate.

S1206: the second authentication device determines a fourth authentication parameter according to the refined second bit string.

In a possible implementation, the second authentication device determines whether the authentication is successful by using the fuzzy commitment scheme, so the second authentication device determines the fourth authentication parameter according to the refined second bit string according to the fuzzy commitment scheme. The fuzzy commitment scheme can make the authentication more accurate.

S1207: the second authentication device transmits an eighth message including the fourth authentication parameter to the first authentication device.

The fourth authentication parameter is determined according to the second bit string by the second authentication device. In a possible implementation, the fourth authentication parameter is encrypted according to the first key, and the eighth message further includes an eighth message authentication code calculated for the fourth authentication parameter using the first key or information about signing the fourth authentication parameter with the private key of the second authentication device.

S1208: the second authentication device receives an authentication result from the first authentication device.

According to the embodiment of the present disclosure, a third authentication parameter is determined according to the refined first bit string, if the fourth authentication parameter and the third authentication parameter are equal, then the authentication is successful, so the mutual authentication between the first authentication device and the second authentication device is realized, thereby the relay attack can be efficiently detected and avoided. Further, the second authentication device refines the second bit string with the extracted second helper data, and determines a fourth authentication parameter according to the refined second bit string by using the fuzzy commitment scheme, thereby the accuracy of the authentication is improved.

As should be understood, in the above mentioned implementations, in a possible implementation, the wireless connection may be BLE connection, and the first signal feature information may be RSS; in another possible implementation, the wireless connection may be Zigbee connection, and the first signal feature information may be LQI. However, the wireless connection in embodiments of the present disclosure is not limited to the above wireless connection, which will not be described herein for brevity.

The steps of the above-mentioned embodiments executed by the second authentication device illustrated in the FIGS. 8-12 corresponds to that of the method embodiment executed by the first authentication device illustrated in the FIGS. 3-7, reference may be made to the corresponding method embodiments for the operations of the related device and the similar expressions, which will not be described herein for brevity.

The present disclosure provide Fuzzy commitment scheme to employ in the authentication method to help to determine the authentication, the principle and the process of the Fuzzy commitment scheme can be found in the following steps:

commit a code word c using a witness x, c and x are n-bit strings.

x can be uniquely expressed in terms of the codeword (committed value) c along with an offset $\delta \in \{0, 1\}^n$ such that $x=c+\delta$.

conceal c using a conventional hash function h, i.e., H(c).

If we have a witness x' that is near x, we can use to translate x' in the direction of x, and recovery of the committed codeword c.

The above explanation can be represented as below:

$$F(c,x)=(H(c),\delta) \text{ Where } x=c+\delta$$

Given x'~x(x' is very similar to x),

Recover c=>c'=f(x'-δ), where f(.) is the decoding function of error correcting code used.

In some embodiments, the first signal feature information set and the second signal feature information set obtained by the first authentication device and the second authentication device can be considered as x and x' in above illustration. The following embodiments of the authentication method are given using the Fuzzy commitment scheme.

Figure 13A:
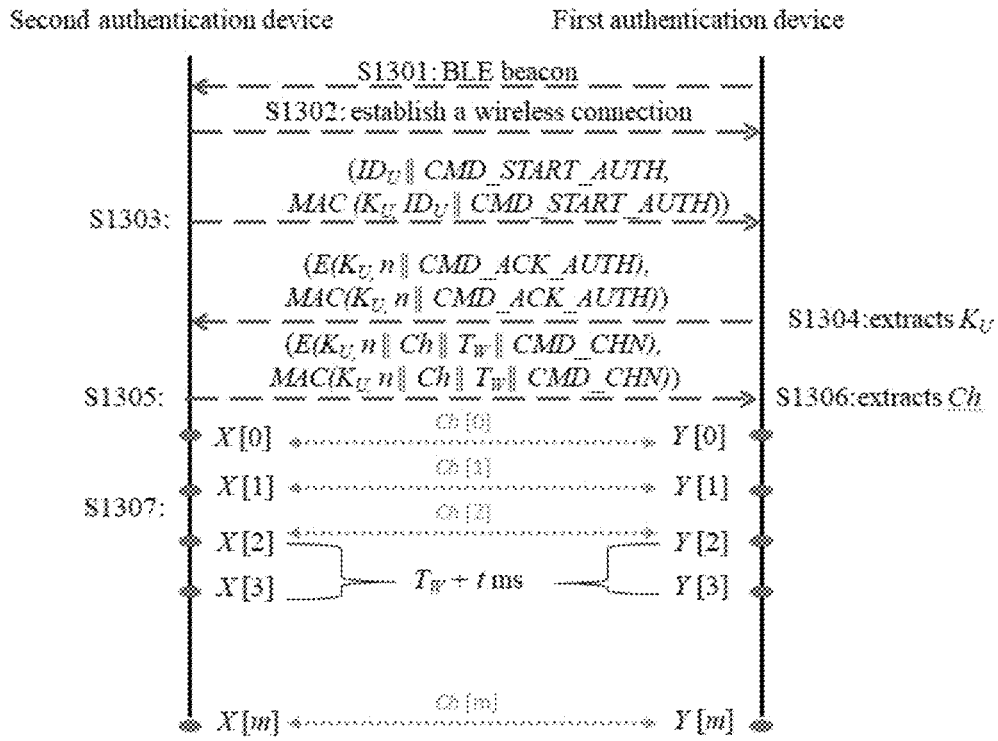
FIGS. 13a and 13b are a schematic flowchart of an authentication method according to an embodiment of the present disclosure.
Figure 13B:
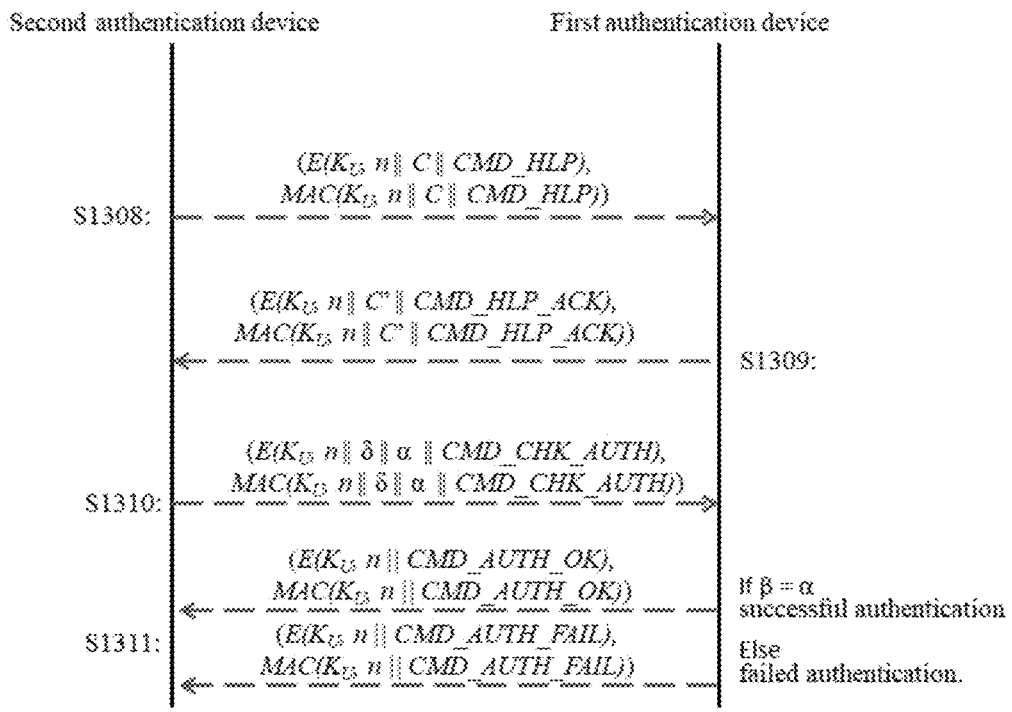

At least one embodiment of the present disclosure provides an authentication method. The following takes the wireless connection being BLE connection, and the first signal feature information and the second signal feature information being RSS as an example to explain the interaction process between the first authentication device and the second authentication device. FIGS. 13a and 13b are a schematic flowchart of an authentication method according to an embodiment of the present disclosure. As illustrated in FIGS. 13a and 13b, the authentication method may include a channel sampling stage and an authentication stage, and the channel sampling stage may be described as the following steps 1301 to 1307 illustrated in FIG. 13a, and the authentication stage may be described as the following steps 1308 to 1311 illustrated in FIG. 13b.

S1301: the first authentication device transmits a periodic BLE beacon to the second authentication device.

S1302: the second authentication device detects the BLE beacons from the first authentication device to establish a wireless connection with the first authentication device using a connection key $K_B$.

S1303: the second authentication device transmits a start message to first authentication device with following content:

($ID_U$||CMD_START_AUTH, MAC($K_U$, $ID_U$||CMD_START_AUTH))

Where $ID_U$ is the identification number of the second authentication device, and CMD_START_AUTH is the command ID. MAC(K, m) is the message authentication code calculated for message m using key K, using secure hash algorithm e.g., SHA-256, hence MAC ($K_U$, $ID_U$||CMD_START_AUTH) is the ninth message authentication code calculated for the identification number $ID_U$ using the first key $K_U$.

S1304: the first authentication device extracts the first key $K_U$ for the identification number $ID_U$ from the table with the correspondence between the first key and the identification number stored in the memory and/or database of the first authentication device, and then transmits response message including a freshness nonce n as follows:

(E($K_U$, n||CMD_ACK_AUTH), MAC($K_U$, n||CMD_ACK_AUTH))

Where the notation E(K, m) denotes encryption of message m using secret key K. CMD_ACK_AUTH is the command id, hence E($K_U$, n||CMD_ACK_AUTH) denotes encryption of the freshness nonce n using the first key $K_U$. MAC($K_U$, n||CMD_ACK_AUTH) is the tenth message authentication code calculated for the freshness nonce n using the first key $K_U$.

S1305: the second authentication device randomly generates a channel sequence Ch, and transmits the following fourth message to the first authentication device:

(E($K_U$, n||Ch||$T_W$||CMD_CHN), MAC($K_U$, n||Ch||$T_W$||CMD_CHN))

Where CMD_CHN is the command ID, $T_W$ is the wait period on each channel. E($K_U$, n||Ch||$T_W$||CMD_CHN) denotes encryption of the freshness nonce n, the wait period $T_W$ and the channel sequence Ch using the first key $K_U$, MAC($K_U$, n||Ch||$T_W$||CMD_CHN) is the fourth message authentication code calculated for the freshness nonce n, the wait period $T_W$ and the channel sequence Ch using the first key $K_U$. Additionally, $T_W$+t is the first period, which is the time parameter plus a second period, and the second period t is a period starting from hopping onto a new channel to sampling the first signal feature information.

S1306: the first authentication device receives the fourth message and extracts the channel sequence Ch.

S1307: the first authentication device and the second authentication device start the channel hopping started from the extracted channel sequence every first period, and record RSS as the first signal feature information and the second signal feature information on one channel involved in a channel hopping after the second period t ms. After channel hopping on each channel, the first authentication device and the second authentication device record the first signal feature information and the second signal feature information, respectively. The set of second signal feature information recorded on the second authentication device is denoted as second signal feature information set X, such as X[0], X[1], X[2], X[3] to X[m], and the set of first signal feature information recorded on the first authentication device is denoted as first signal feature information set Y, such as Y[0], Y[1], Y[2], Y[3] to Y[m].

S1308: the second authentication device identifies the activity case of the second authentication device, and determines the second quantization parameter according to the activity case of the first authentication device; then the second authentication device applies low pass filter to the second signal feature information set X to remove noise; after that, the second authentication device applies multi-bit quantization to the filtered second signal feature information set X with the second quantization parameter and generates the second bit string $b_X$ and the second helper data C. The following sixth message is transmitted to the first authentication device:

$(E(K_U, n\|C\|CMD\_HLP), MAC(K_U, n\|C\|CMD\_HLP))$

Where CMD_HLP is the command ID, $E(K_U, n\|C\|CMD\_HLP)$ denotes encryption of the second helper data C and the freshness nonce n using the first key K. $MAC(K_U, n\|C\|CMD\_HLP)$ is the sixth message authentication code calculated for the second helper data C and the freshness nonce n using the first key $K_U$.

S1309: the first authentication device identifies the activity case of the second authentication device and determines the first quantization parameter according to the activity case of the second authentication device; then the first authentication device applies a low pass filter to the first signal feature information set Y; the first authentication device applies the first quantization to the filtered first signal feature information set Y with the first quantization parameter to generate the first bit string $b_Y$ and the first helper data; after that, the first authentication device receives the sixth message from the second authentication device and refines the first bit string $b_Y$ with the second helper data C in the fourth message, and calculates the third helper data C' according to the first helper data and the second helper data C, the following seventh message is transmitted to the second authentication device:

$(E(K_U, n\|C'\|CMD\_HLP\_ACK), MAC(K_U, n\|C'\|CMD\_HLP\_ACK))$

Where the CMD_HLP_ACK is the command ID, $E(K_U, n\|C'\|CMD\_HLP\_ACK)$ denotes encryption of the second helper data C and the freshness nonce n using the first key $K_U$. $MAC(K_U, n\|C'\|CMD\_HLP\_ACK)$ is the seventh message authentication code calculated for the third helper data C' and the freshness nonce n using the first key $K_U$.

S1310: the second authentication device receives a seventh message including the third helper data from the first authentication device and refines the second bit string $b_X$ with the third helper data C'; the second authentication device chooses a code word W, and the code word W is a code word with 256 bits and recommended for strong security; the second authentication device determines the fourth authentication parameter $\alpha$ according to the refined second bit string $b_X$ by using a fuzzy commitment scheme, the fourth authentication parameter $\alpha$ is calculated as following:

$F(b_X, W) = (\delta, \alpha)$, where $\delta = b_X - W$, and $\alpha = H(W)$.

the second authentication device transmits the following eighth message to the first authentication device:

$(E(K_U, n\|\delta\|\alpha\|CMD\_CHK\_AUTH), MAC(K_U, n\|\delta\|\alpha\|CMD\_CHK\_AUTH))$ Where CMD_CHK_AUTH is the command id, $E(K_U, n\|\delta\|\alpha\|CMD\_CHK\_AUTH)$ denotes encryption of the fourth authentication parameter $\alpha$ and the freshness nonce n using the first key $K_U$. $MAC(K_U, n\|\delta\|\alpha\|CMD\_CHK\_AUTH)$ is the eighth message authentication code calculated for the fourth authentication parameter $\alpha$ and the freshness nonce n using the first key $K_U$.

S1311: the first authentication device determines the third authentication parameter $\beta$ according to the refined first bit string $b_Y$ by using a fuzzy commitment scheme, the third authentication parameter $\beta$ is calculated as following:

$W' = f(b_Y - \delta)$ and $\beta = H(W')$, where f(.) is the decoding function of error correcting codes used. H(.) is a secure hash algorithm e.g., SHA256—it can be either with or without key $K_B$ (same convention applies to both the first authentication device and the second authentication device).

if $\beta = \alpha$, then it is considered as successful authentication, the first authentication device transmits the following authentication result to second authentication device:

$(E(K_U, n\|CMD\_AUTH\_OK), MAC(K_U, n\|CMD\_AUTH\_OK))$

Where CMD_AUTH_OK is the command ID, $E(K_U, n\|CMD\_AUTH\_OK)$ denotes encryption of the CMD_AUTH_OK and the freshness nonce n using the first key $K_U$. $MAC(K_U, n\|CMD\_AUTH\_OK)$ is the successful message authentication code calculated for the CMD_AUTH_OK and the freshness nonce n using the first key $K_U$.

else, the authentication is failed, the first authentication device transmits the following authentication result to second authentication device:

$(E(K_U, n\|CMD\_AUTH\_FAIL), MAC(K_U, n\|CMD\_AUTH\_FAIL))$

Where CMD_AUTH_FAIL is the command ID, $E(K_U, n\|CMD\_AUTH\_FAIL)$ denotes encryption of the CMD_AUTH_FAIL and the freshness nonce n using the first key $K_U$. $MAC(K_U, n\|CMD\_AUTH\_FAIL)$ is the failed message authentication code calculated for the CMD_AUTH_FAIL and the freshness nonce n using the first key $K_U$.

The freshness nonce n in the above embodiment is the same in each step of one period. However, the freshness nonce n is different in each period of the channel hopping. Hence, if an attacker has captured the freshness nonce in the previous session messages and tries to launch Replay attack, the device can identify that the freshness nonce was used in the previous session messages, thereby effectively avoiding the Replay attack.

It should be understood that the authentication method is based on the authentication method of the method embodiments illustrated in FIGS. 3-12, reference may be made to the above method embodiments for the operations of the related device and the similar expressions, which will not be described herein again for brevity.

Figure 14A:
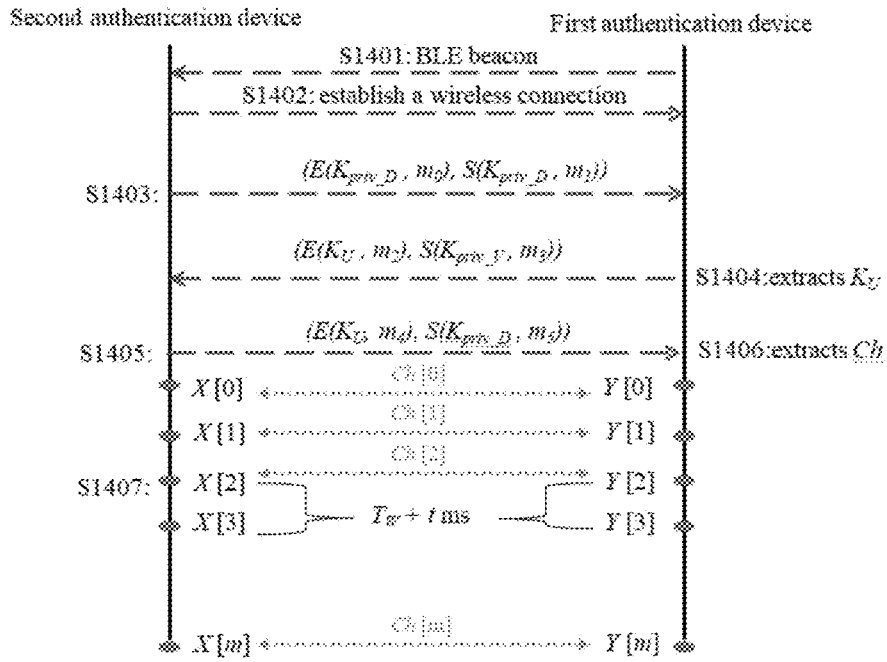
FIGS. 14a and 14b are a schematic flowchart of another authentication method according to an embodiment of the present disclosure.
Figure 14B:
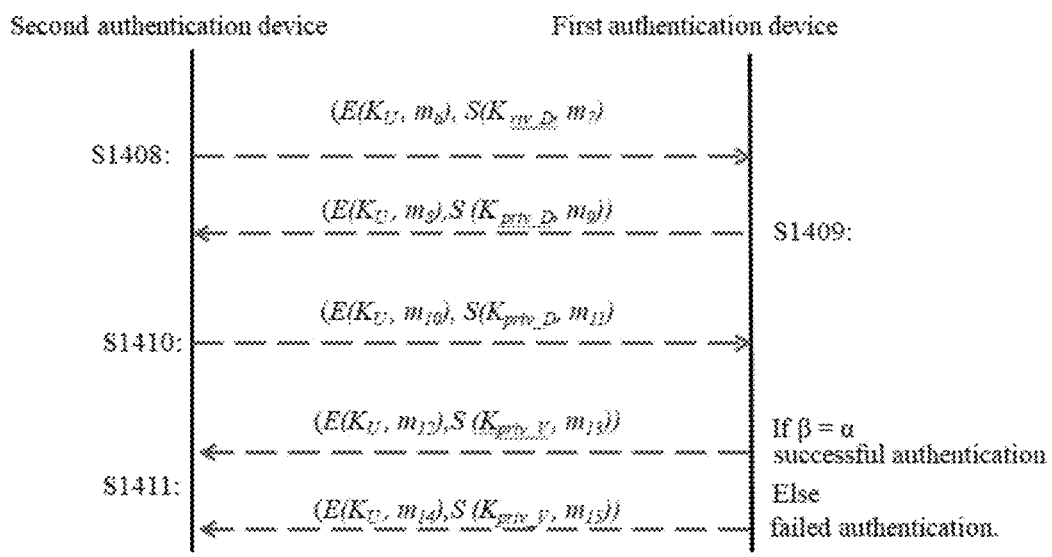

At least one embodiment of the present disclosure provides an authentication method. The method may be executed by the first authentication device and the second authentication device, the wireless connection may be BLE connection, and the first signal feature information and the second signal feature information may be RSS. The method is based on the Public-Key Infrastructure (PKI) based settings. The channel sampling stage and the authentication stage as described in the above embodiment illustrated in 14a and 14b will be followed exactly in the same manner except that the first authentication device and the second authentication device use their private keys for signing the message content. FIGS. 14a and 14b are a schematic flowchart of an authentication method according to an embodiment of the present disclosure. As illustrated in FIGS. 14a and 14b, the authentication method may include a channel sampling stage and an authentication stage, and the channel sampling stage may be described as the following steps 1401 to 1407 illustrated in FIG. 14a and the authentication stage may be described as the following steps 1408 to 1411 illustrated in FIG. 14b.

S1401: the first authentication device transmits a periodic BLE beacons to the second authentication device.

S1402: the second authentication device detects the BLE beacons from the first authentication device to establish a wireless connection with the first authentication device using a connection key $K_B$.

S1403: the second authentication device transmits a start message to first authentication device with following content:

$(E(K_{pub\_v}, m_0), S(K_{priv\_D}, m_1))$

Where $m_0 = ID_U \| CMD\_START\_AUTH$, $m_1 = H(K_U, E(K_{pub\_v}, m_0))$, and $S(K, m)$ denotes digitally signing m using key K, $ID_U$ is the identification number of the second authentication device, and CMD_START_AUTH is the command ID. $H(K, m)$ is the secure hash calculated for message m using key K, using secure hash algorithm e.g., SHA-256. Hence, $E(K_{pub\_v}, m_0)$ denotes encryption of the identification number $ID_U$ using the public key $K_{pub\_v}$, $S(K_{priv\_D}, m_1)$ digitally signing the identification number $ID_U$ using the private key $K_{priv\_D}$ of the second authentication device.

S1404: the first authentication device extracts the first key $K_U$ for the identification number $ID_U$ from the table with the correspondence between the first key and the identification number stored in the memory and/or database of the first authentication device, and then transmits response message including a freshness nonce n as follows:

$(E(K_U, m_2), S(K_{priv\_V}, m_3))$

Where $m_2 = n \| CMD\_ACK\_AUTH$, $m_3 = H(K_U, E(K_U, m_2))$ and CMD_ACK_AUTH is the command id, $E(K_U, m_2)$ denotes encryption of the freshness nonce n using the first key $K_U$, $S(K_{priv\_V}, m_3)$ denotes digitally signing the freshness nonce n using the private key $K_{priv\_V}$ of the first authentication device.

S1405: the second authentication device randomly generates the channel sequence Ch, and transmits the following fourth message to the first authentication device:

$(E(K_U, m_4), S(K_{priv\_D}, m_5))$

Where $m_4 = n \| Ch \| T_W \| CMD\_CHN$, $m_5 = H(K_U, E(K_U, m_4))$, CMD_CHN is the command id, and $T_W$ is the wait period on each channel, $E(K_U, m_4)$ denotes encryption of the freshness nonce n, the wait period $T_W$ and the channel sequence Ch using the first key $K_U$, $S(K_{priv\_D}, m_5)$ denotes digitally signing the freshness nonce n, the wait period $T_W$ and the channel sequence Ch using the private key $K_{priv\_D}$ of the second authentication device.

S1406: the first authentication device receives the fourth message and extracts the channel sequence Ch.

S1407: the first authentication device and the second authentication device start the channel hopping started from the extracted channel sequence every first period, and record RSS as the first signal feature information and the second signal feature information on one channel involved in a channel hopping after the second period t ms. After channel hopping on each channel, the first authentication device and the second authentication device record the first signal feature information and the second signal feature information, respectively. The set of second signal feature information recorded on the second authentication device is denoted as second signal feature information set X, such as X[0], X[1], X[2], X[3] to X[m], and the set of first signal feature information recorded on the first authentication device is denoted as first signal feature information set Y, such as Y[0], Y[1], Y[2], Y[3] to Y[m].

S1408: the second authentication device identifies the activity case of the second authentication device, and determines the second quantization parameter according to the activity case of the first authentication device; then the second authentication device applies low pass filter to the second signal feature information set X to remove noise; after that, the second authentication device applies multi-bit quantization to the filtered second signal feature information set X with the second quantization parameter and generates the second bit string $b_X$ and the second helper data C. The following sixth message is transmitted to the first authentication device:

$(E(K_U, m_6), S(K_{priv\_D}, m_7))$ where $m_6 = n \| C \| CMD\_HLP$, $m_7 = H(K_U, E(K_U, m_6))$, and CMD_HLP is the command id, $E(K_U, m_6)$ denotes encryption of the second helper data C and the freshness nonce n using the first key $K_U$, $S(K_{priv\_D}, m_7)$ denotes digitally signing the second helper data C and the freshness nonce n using the private key $K_{priv\_V}$ of the second authentication device.

S1409: the first authentication device identifies the activity case of the second authentication device and determines the first quantization parameter according to the activity case of the second authentication device; then the first authentication device applies a low pass filter to the first signal feature information set Y; the first authentication device applies the first quantization to the filtered first signal feature information set Y with the first quantization parameter to generate the first bit string $b_Y$ and the first helper data; after that, the first authentication device receives the sixth message from the second authentication device and refines the first bit string $b_Y$ with the second helper data C in the sixth message, and calculates the third helper data C' according to the first helper data and the second helper data C, the following seventh message is transmitted to the second authentication device:

$(E(K_U, m_8), S(K_{priv\_V}, m_9))$

Where $m_8 = n \| C' \| CMD\_HLP\_ACK$, $m_9 = H(K_U, E(K_U, m_8))$, and CMD_HLP_ACK is the command ID. $E(K_U, m_8)$ denotes encryption of the third helper data C' and the freshness nonce n using the first key $K_U$. $S(K_{priv\_V}, m_9)$ denotes digitally signing the third helper data C' and the freshness nonce n using the private key $K_{priv\_V}$ of the first authentication device.

S1410: the second authentication device receives a seventh message including the third helper data from the first authentication device and refines the second bit string $b_X$ with the third helper data C'; the second authentication device chooses a code word W, and the code word W is a code word with 256 bits and recommended for strong security; the second authentication device determines the fourth authentication parameter α according to the refined second bit string $b_X$ by using a fuzzy commitment scheme, the fourth authentication parameter α is calculated as following:

$F(b_X, W) = (\delta, \alpha)$, where $\delta = b_X - W$, and $\alpha = H(W)$.

the second authentication device transmits the following eighth message to the first authentication device:

$(E(K_U, m_{10}), S(K_{priv\_D}, m_{11}))$

Where $m_{10} = n\|\delta\|\alpha\|CMD\_CHK\_AUTH$, $m_{11} = \|(K_U, E(K_U, m_{10}))$, and CMD_CHK_AUTH is the command ID. $E(K_U, m_{10})$ denotes encryption of the fourth authentication parameter α and the freshness nonce n using the first key $K_U$. $S(K_{priv\_D}, m_{11})$ denotes digitally signing the fourth authentication parameter α and the freshness nonce n using the private key $K_{priv\_V}$ of the second authentication device.

S1410: the first authentication device determines the third authentication parameter β according to the refined first bit string $b_Y$ by using a fuzzy commitment scheme, the third authentication parameter β is calculated as following:

$W' = f(b_Y - \delta)$ and $\beta = H(W')$, where f(.) is the decoding function of error correcting codes used. H(.) is a secure hash algorithm e.g., SHA256—it can be either with or without key $K_B$ (same convention applies to both the first authentication device and the second authentication device).

if β=α, then it is considered as successful authentication, the first authentication device transmits the following authentication result to second authentication device:

$(E(K_U, m_{12}), S(K_{priv\_V}, m_{13}))$

Where $m_{12} = n\|CMD\_AUTH\_OK$, $m_{13} = H(K_U, E(K_U, m_{12}))$, and CMD_AUTH_OK is the command ID. $E(K_U, m_{12})$ denotes encryption of the CMD_AUTH_OK and the freshness nonce n using the first key $K_U$. $S(K_{priv\_V}, m_{13})$ denotes digitally signing the CMD_AUTH_OK and the freshness nonce n using the private key $K_{priv\_V}$ of the second authentication device.

else, the authentication is failed, the first authentication device transmits the following authentication result to second authentication device:

$(E(K_U, m_{14}), S(K_{priv\_V}, m_{15}))$

Where $m_{14} = n\|CMD\_AUTH\_FAIL$, $m_{15} = H(K_U, E(K_U, m_{14}))$ and CMD_AUTH_FAIL is the command ID. $E(K_U, mu)$ denotes encryption of the CMD_AUTH_FAIL and the freshness nonce n using the first key $K_U$. $S(K_{priv\_V}, m_{15})$ denotes digitally signing the CMD_AUTH_FAIL and the freshness nonce n using the private key $K_{priv\_V}$ of the second authentication device.

The embodiment above used on PKI is based on the encryption schemes, each of the first authentication device and the second authentication device has two keys, such as a private key and a public key. The transmitting device, such as the first authentication device, will use the private key thereof for encrypting the message, the receiving device, such as the second authentication device, can decrypt the message with the public key of the transmitting device.

The freshness nonce n in the above embodiment is the same in each step of one period. However, the freshness nonce n is different in each period of the channel hopping. Hence, if an attacker has captured the freshness nonce in the previous session messages and tries to launch Replay attack, the device can identify that the freshness nonce was used in the previous session messages, thereby effectively avoiding the Replay attack.

It should be understood that the authentication method is based on the authentication method of the method embodiments illustrated in FIGS. 3-12, reference may be made to the above method embodiments for the operations of the related device and the similar expressions, which will not be described herein again for brevity.

Figure 15:
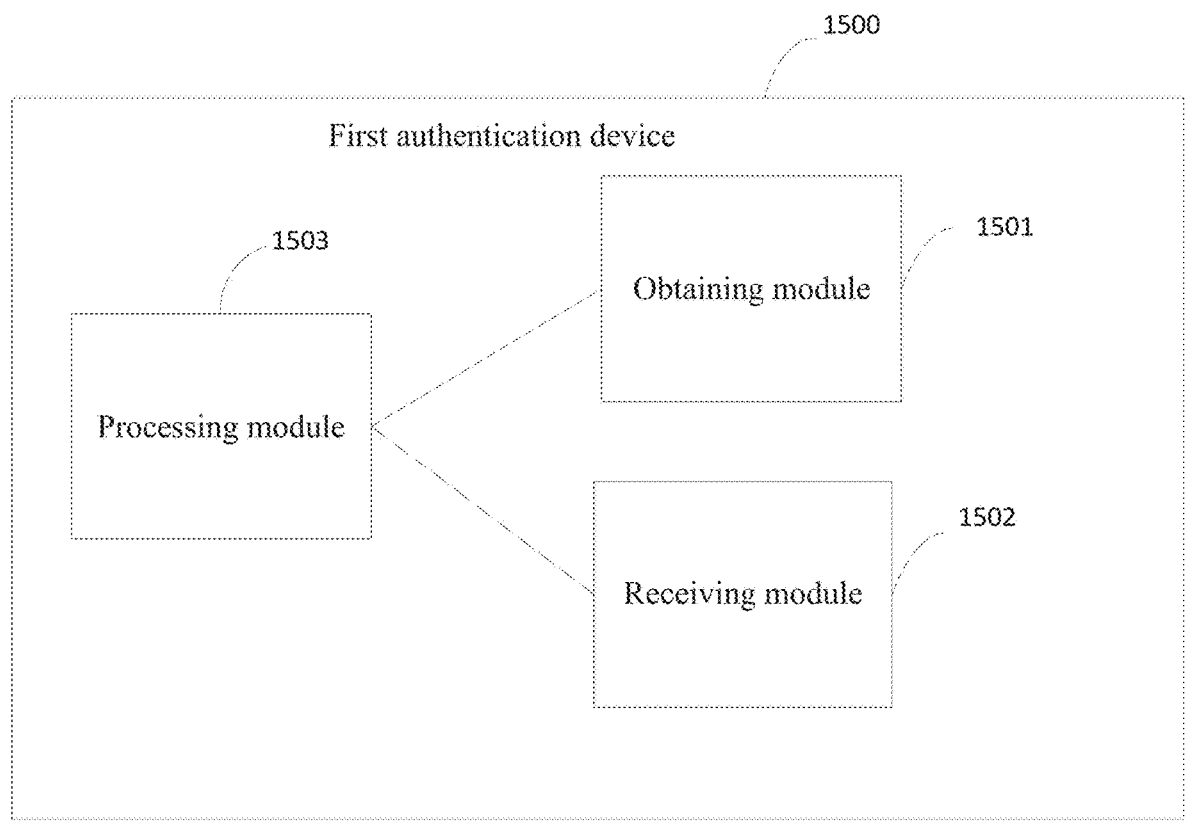
FIG. 15 is a schematic structural diagram of a first authentication device according to an embodiment of the present disclosure.

At least one embodiment of the present disclosure provides a first authentication device. The first authentication device may execute the above implementation of the authentication method shown in FIG. 3. Reference may be made to the above method embodiments for the operations of the related device and the similar expressions. FIG. 15 is a schematic structural diagram of a first authentication device according to an embodiment of the present disclosure. As illustrated in FIG. 15, the first authentication device 1500 may include an obtaining module 1501, a receiving module 1502 and a processing module 1503. The first authentication device 1500 is deployed in wireless network, both of the obtaining module 1501 and the receiving module 1502 are connected to the processing module 1503.

The obtaining module 1501 is configured to obtain first signal feature information by sampling a first wireless signal sent by a second authentication device, where the first signal feature information is used to indicate a feature of the first wireless signal. The receiving module 1502 is configured to receive second signal feature information from the second authentication device, and the second signal feature information is obtained by the second authentication device by sampling a second wireless signal sent by the first authentication device, where the second signal feature information is used to indicate a feature of the second wireless signal. The processing module 1503 is configured to determine whether the authentication is successful according to the first signal feature information and the second signal feature information.

It should be understood that the device depicted in FIG. 15 may perform the authentication method shown in FIGS. 3-7, and the first authentication device related in the embodiments shown in FIGS. 3-7 may also be structured in the same way as the first authentication device shown in FIG. 15, which will not be described herein again for brevity.

Figure 16:
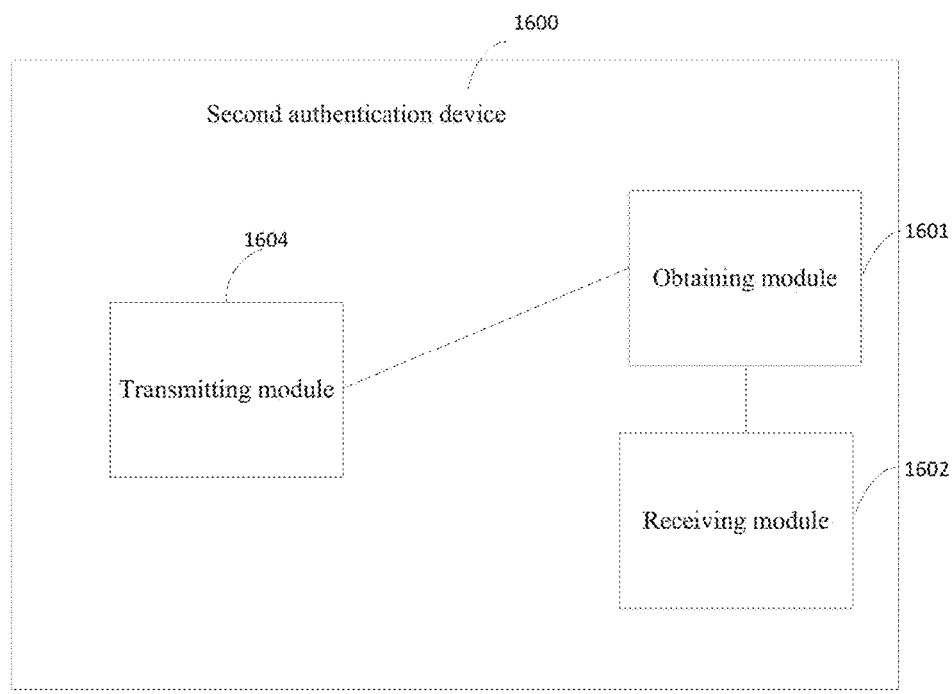
FIG. 16 is a schematic structural diagram of a second authentication device according to an embodiment of the present disclosure.

At least one embodiment of the present disclosure provides a second authentication device. The second authentication device may execute the above implementation of the authentication method shown in FIG. 8. Reference may be made to the above method embodiments for the operations of the related device and the similar expressions. FIG. 16 is a schematic structural diagram of a second authentication device according to an embodiment of the present disclosure. As illustrated in FIG. 16, the second authentication device may include an obtaining module 1601, a transmitting module 1604 and a receiving module 1602.

The obtaining module 1601 is configured to obtain a second signal feature information by sampling a second wireless signal sent by a first authentication device, where the second signal feature information is used to indicate a feature of the second wireless signal. The transmitting module 1604 is configured to transmit the second signal feature information to the first authentication device. The receiving module 1602 is configured to receive an authentication result from the first authentication device, and the authentication result is determined by the first authentication device according to the first signal feature information and the second signal feature information.

It should be understood that the device depicted in FIG. 16 may perform the authentication method shown in FIGS. 8-12, and the second authentication device related in the embodiments shown in FIGS. 8-12 may also be structured in the same way as the second authentication device shown in FIG. 16, which will not be described herein again for brevity.

At least one embodiment of the present disclosure provides a first authentication device, the first authentication device includes a processor and a memory having executable instructions stored thereon that when executed by the processor cause the processor to implement the method according to the embodiments of the present disclosure shown in FIGS. 3-7.

Figure 17:
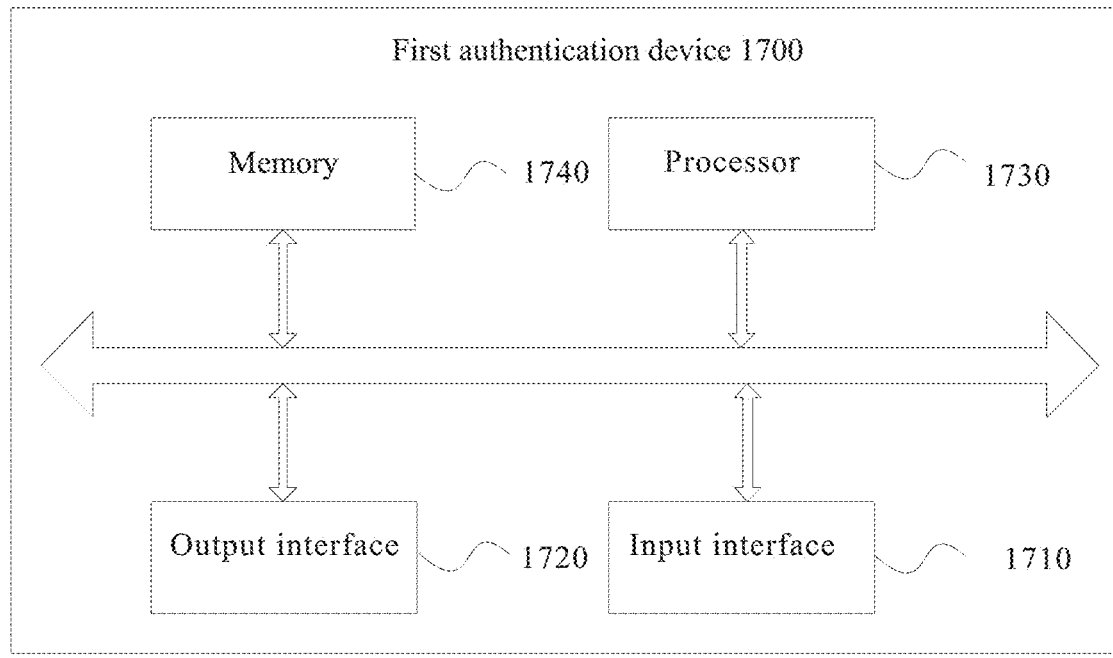
FIG. 17 is a schematic structural diagram of a first authentication device according to an embodiment of the present disclosure.

FIG. 17 is a schematic structural diagram of a first authentication device according to an embodiment of the present disclosure. The first authentication device 1700 may be the first authentication device in the above device embodiments, such as the first authentication device in FIG. 15, and can be configured to implement content pertaining to the first authentication device corresponding to the method in the method embodiments. As can be illustrated in the FIG. 17, the first authentication device includes an input interface 1710, an output interface 1720, a processor 1730, and a memory 1740. The input interface 1710, the output interface 1720, the processor 1730, and the memory 1740 can be connected by a bus system. The memory 1740 is configured to store programs, instructions or codes. The processor 1730 is configured to execute the programs, the instructions or the codes in the memory 1740 to control the input interface 1710 to receive a signal and control the output interface 1720 to transmit a signal and complete the operations in the foregoing method embodiments.

At least one embodiment of the present disclosure provides a second authentication device, the second authentication device includes a processor and a memory having executable instructions stored thereon that when executed by the processor cause the processor to implement the method according to the embodiments of the present disclosure shown in FIGS. 8-12.

Figure 18:
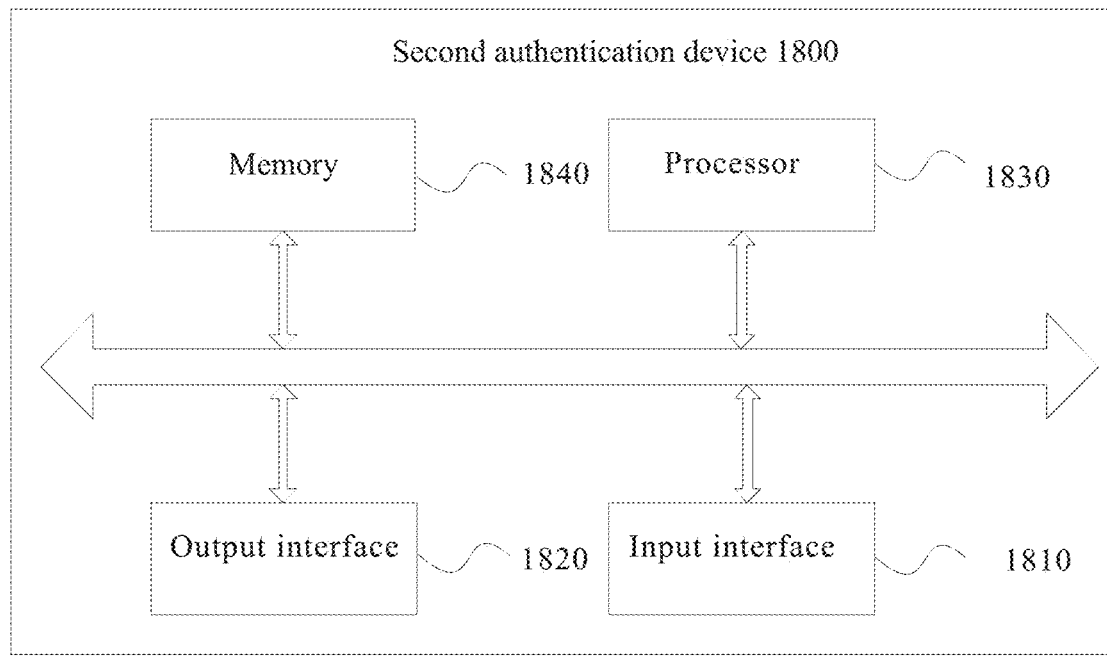
FIG. 18 is a schematic structural diagram of a second authentication device according to an embodiment of the present disclosure.

FIG. 18 is a schematic structural diagram of a second authentication device according to an embodiment of the present disclosure. The second authentication device 1800 may be the second authentication device in the above device embodiments, such as the second authentication device in FIG. 16, and can be configured to implement content pertaining to the second authentication device corresponding to the method in the method embodiments. As can be illustrated in the FIG. 18, the second authentication device includes an input interface 1810, an output interface 1820, a processor 1830, and a memory 1840. The input interface 1810, the output interface 1820, the processor 1830, and the memory 1840 can be connected by a bus system. The memory 1840 is configured to store programs, instructions or codes. The processor 1830 is configured to execute the programs, the instructions or the codes in the memory 1840 to control the input interface 1810 to receive a signal and control the output interface 1820 to transmit a signal and complete the operations in the foregoing method embodiments.

At least one embodiment of the present disclosure provides a vehicle, the vehicle includes the first authentication device according to the embodiments of the present disclosure. The first authentication device may be the first authentication device in the above device embodiments, such as the second authentication device in FIG. 15 or FIG. 17, and can be configured to implement content pertaining to the first authentication device corresponding to the method in the method embodiments.

At least one embodiment of the present disclosure provides a user device, the user device includes the second authentication device according to the embodiments of the present disclosure. The second authentication device may be the second authentication device in the above device embodiments, such as the second authentication device in FIG. 16 or FIG. 18, and can be configured to implement content pertaining to the second authentication device corresponding to the method in the method embodiments.

At least one embodiment of the present disclosure provides an authentication system, the authentication system includes the above-mentioned vehicle and the above-mentioned user device. The vehicle includes the first authentication device according to the embodiments of the present disclosure, and the user device includes the second authentication device according to the embodiments of the present disclosure, therefore the authentication system can be configured to implement content pertaining to the first authentication device and the second authentication device corresponding to the method in the method embodiments.

As should be understood, the scenario of the authentication is not limited to the vehicle and the user device, but many practical applications and can be employed widely in similar wireless systems that require authentication, other devices that have wireless capability can also employ the scenario of the authentication, such as the wireless enabled door lock that can be opened by user phone's message, smart phone appliances, industrial devices, wearable devices etc., which will not be described herein for brevity.

Some embodiments of the present disclosure are an ultra-lightweight mechanism, easy to incorporate or implement in any BLE enabled devices, even for resource constrained devices. Some embodiments of the present disclosure provide robust mutual authentication by employing BLE channel physical layer features—RSS that are hard to spoof and predict by adversary, and Fuzzy commitment-based constructs that are cryptographically secure, lightweight, and do not reveal information about shared secret.

At least one embodiment of the present disclosure provides a computer storage medium storing computer executable instructions which, when being executed, implement the method according to the embodiments of the present disclosure shown in FIGS. 3-7.

At least one embodiment of the present disclosure provides a computer storage medium storing computer executable instructions which, when being executed, implement the method according to the embodiments of the present disclosure shown in FIGS. 8-12.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Terms such as "first", "second" and the like in the specification and claims of the present disclosure as well as in the above drawings are intended to distinguish different objects, but not intended to define a particular order.

The term such as "and/or" in the embodiments of the present disclosure is merely used to describe an association between associated objects, which indicates that there may be three relationships, for example, A and/or B may indicate presence of A only, of both A and B, and of B only.

In the embodiments of the present disclosure, expressions such as "exemplary" or "for example" are used to indicate illustration of an example or an instance. In the embodiments of the present disclosure, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or vehicle wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, vehiclerier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a obtaining of interoperative hardware units, including one or more processors as described above, in conjunction with suitable software and/or firmware.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In the claims, the word "including" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the disclosure be defined by the claims appended hereto.

The invention claimed is:

1. A method, comprising:
   obtaining, by a first authentication device, first signal feature information according to a first wireless signal sent by a second authentication device, wherein the first signal feature information indicates a feature of the first wireless signal;
   receiving, by the first authentication device, a first message comprising second signal feature information from the second authentication device, wherein the second signal feature information is obtained by the second authentication device according to a second wireless signal sent by the first authentication device, the second signal feature information indicates a feature of the second wireless signal, the second signal feature information is encrypted according to a first key associated with the second authentication device, the first message further comprises a first message authentication code for the second signal feature information, and the first message authentication code is associated with at least one of the first key or information about signing the second signal feature information with a private key of the second authentication device; and
   determining, by the first authentication device, whether authentication is successful according to the first signal feature information and the second signal feature information.

2. The method according to claim 1, wherein the obtaining, by the first authentication device, the first signal feature information according to the first wireless signal sent by the second authentication device comprises:
   obtaining, by the first authentication device, a first signal feature information set according to multiple first wireless signals on multiple channels involved in a channel hopping;
   wherein the receiving, by the first authentication device, the first message comprising the second signal feature information from the second authentication device comprises:
   receiving, by the first authentication device, a second message comprising a second signal feature information set from the second authentication device, wherein the first message comprises the second message, the second signal feature information comprises the second signal feature information set obtained according to multiple second wireless signals on multiple channels involved in the channel hopping by the second authentication device, and the first message authentication code comprises a second message authentication code calculated for the second signal feature information set using at least one of the first key or information about signing the second signal feature information set with a private key of the second authentication device;
   wherein the determining, by the first authentication device, whether the authentication is successful according to the first signal feature information and the second signal feature information comprises:
   determining, by the first authentication device, a first similarity between the first signal feature information set and the second signal feature information set; and
   determining, by the first authentication device, the authentication is successful in response to determining that the first similarity meets a threshold.

3. The method according to claim 1, wherein the obtaining, by the first authentication device, the first signal feature information according to the first wireless signal sent by a second authentication device comprises:
   obtaining, by the first authentication device, a first signal feature information set according to multiple first wireless signals on multiple channels involved in a channel hopping;
   wherein the method further comprises:
   applying, by the first authentication device, first quantization to the first signal feature information set with a first quantization parameter to generate a first bit string and a first helper data, wherein the first helper data is the first signal feature information that is discarded during the first quantization;
   wherein the receiving, by the first authentication device, the first message comprising the second signal feature information from the second authentication device comprises:
   receiving, by the first authentication device, a third message comprising a second bit string from the second authentication device, wherein the first message comprises the third message, the second signal feature information comprises the second bit string determined based on second quantization of a second signal feature information set by the second authentication device, and the first message authentication code comprises a third message authentication code calculated for the second bit string using at least one of the first key or information about signing the second bit string with a private key of the second authentication device; and
   wherein the determining, by the first authentication device, whether the authentication is successful according to the first signal feature information and the second signal feature information comprises:
   determining, by the first authentication device, a second similarity between the first bit string and the second bit string; and
   determining, by the first authentication device, the authentication is successful in response to determining that the second similarity meets a threshold.

4. The method according to claim 2, wherein before the obtaining, by the first authentication device, the first signal feature information set according to multiple first wireless signals on multiple channels involved in the channel hopping, the method further comprises:
   receiving, by the first authentication device, a fourth message from the second authentication device, wherein the fourth message comprises a channel sequence randomly generated by the second authentication device and a time parameter for indicating a wait period on each channel involved in the channel hopping, the channel sequence and the time parameter are encrypted according to the first key, and the fourth message further comprises a fourth message authentication code calculated for the channel sequence and the time parameter using at least one of the first key or information about signing the channel sequence and the time parameter with the private key of the second authentication device;
   extracting, by the first authentication device, the channel sequence and the time parameter from the fourth message; and
   wherein the obtaining, by the first authentication device, a first signal feature information set according to multiple first wireless signals on multiple channels involved in a channel hopping comprises:
   obtaining, by the first authentication device, the first signal feature information set according to the multiple first wireless signals on the multiple channels involved in the channel hopping started from the extracted channel sequence every first period, wherein the first period is the time parameter plus a second period, and the second period is a period starting from hopping onto a new channel to obtaining the first signal feature information.

5. The method according to claim 1, wherein the first signal feature information comprises at least one of received signal strength (RSS) or a link quality indicator (LQI).

6. The method according to claim 1, wherein the first authentication device is a vehicle, and the second authentication device is a user's device communicating with the vehicle.

7. The method according to claim 1, wherein the first message authentication code is calculated based on a secure hash algorithm.

8. A device, wherein the device is a first authentication device and comprises at least one processor and at least one memory, wherein the at least one processor is coupled to the at least one memory, and the at least one memory stores programming instructions for execution by the at least one processor to cause the device to perform operations comprising:
  obtaining first signal feature information according to a first wireless signal sent by a second authentication device, wherein the first signal feature information indicates a feature of the first wireless signal;
  receiving a first message comprising second signal feature information from the second authentication device, wherein the second signal feature information is obtained by the second authentication device according to a second wireless signal sent by the first authentication device, the second signal feature information indicates a feature of the second wireless signal, the second signal feature information is encrypted according to a first key associated with the second authentication device, the first message further comprises a first message authentication code for the second signal feature information, and the first message authentication code is associated with at least one of the first key or information about signing the second signal feature information with a private key of the second authentication device; and
  determining whether authentication is successful according to the first signal feature information and the second signal feature information.

9. The device according to claim 8, wherein the obtaining first signal feature information comprises:
  obtaining a first signal feature information set according to multiple first wireless signals on multiple channels involved in a channel hopping;
  wherein the receiving the first message comprising the second signal feature information comprises:
  receiving a second message comprising a second signal feature information set from the second authentication device, wherein the first message comprises the second message, the second signal feature information comprises the second signal feature information set obtained according to multiple second wireless signals on multiple channels involved in the channel hopping by the second authentication device, and the first message authentication code comprises a second message authentication code calculated for the second signal feature information set using at least one of the first key or information about signing the second signal feature information set with a private key of the second authentication device;
  and wherein the determining whether authentication is successful comprises:
  determining a first similarity between the first signal feature information set and the second signal feature information set; and
  determining the authentication is successful in response to determining that the first similarity meets a threshold.

10. The device according to claim 8, wherein the obtaining first signal feature information comprises:
  obtaining a first signal feature information set according to multiple first wireless signals on multiple channels involved in a channel hopping;
  wherein the operations further comprise:
  applying first quantization to the first signal feature information set with a first quantization parameter to generate a first bit string and a first helper data, wherein the first helper data is the first signal feature information that is discarded during the first quantization;
  wherein the receiving the first message comprising the second signal feature information comprises:
  receiving a third message comprising a second bit string from the second authentication device, wherein the first message comprises the third message, the second signal feature information comprises the second bit string determined based on second quantization of a second signal feature information set by the second authentication device, and the first message authentication code comprises a third message authentication code calculated for the second bit string using at least one of the first key or information about signing the second bit string with a private key of the second authentication device; and
  wherein the determining whether the authentication is successful comprises:
  determining a second similarity between the first bit string and the second bit string; and
  determining the authentication is successful in response to determining that the second similarity meets a threshold.

11. The device according to claim 9, wherein before the obtaining a first signal feature information set, the operations further comprise:
  receiving a fourth message from the second authentication device, wherein the fourth message comprises a channel sequence randomly generated by the second authentication device and a time parameter for indicating a wait period on each channel involved in the channel hopping, the channel sequence and the time parameter are encrypted according to the first key, and the fourth message further comprises a fourth message authentication code calculated for the channel sequence and the time parameter using at least one of the first key or information about signing the channel sequence and the time parameter with the private key of the second authentication device;
  extracting the channel sequence and the time parameter from the fourth message; and
  obtaining the first signal feature information set according to the multiple first wireless signals on the multiple channels involved in the channel hopping started from the extracted channel sequence every first period, wherein the first period is the time parameter plus a second period, and the second period is a period starting from hopping onto a new channel to obtaining the first signal feature information.

12. The device according to claim 8, wherein the first signal feature information comprises at least one of received signal strength (RSS) or a link quality indicator (LQI).

13. The device according to claim 8, wherein the first authentication device is a vehicle, and the second authentication device is a user's device communicating with the vehicle.

14. The device according to claim 8, wherein the first message authentication code is calculated based on a secure hash algorithm.

15. A device, wherein the device is a second authentication device and comprises at least one processor and at least one memory, wherein the at least one processor is coupled to the at least one memory, and the at least one memory stores programming instructions for execution by the at least one processor to cause the device to perform operations comprising:
  obtaining second signal feature information according to a second wireless signal sent by a first authentication device, wherein the second signal feature information indicates a feature of the second wireless signal;
  transmitting a first message comprising the second signal feature information to the first authentication device, wherein the second signal feature information is encrypted according to a first key associated with the second authentication device, the first message further comprises a first message authentication code for the second signal feature information, and the first message authentication code is associated with at least one of the first key or information about signing the second signal feature information with a private key of the second authentication device; and
  receiving an authentication result from the first authentication device, wherein the authentication result is determined by the first authentication device according to the first signal feature information and the second signal feature information.

16. The device according to claim 15, wherein the obtaining second signal feature information comprises:
  obtaining a second signal feature information set according to multiple second wireless signals on multiple channels involved in a channel hopping;
  and wherein the transmitting the first message comprising the second signal feature information comprises transmitting a second message comprising the second signal feature information set to the first authentication device, wherein the first message comprises the second message, the second signal feature information comprises the second signal feature information set, and the first message authentication code comprises a second message authentication code calculated for the second signal feature information set using at least one of the first key or information about signing the second signal feature information set with a private key of the second authentication device.

17. The device according to claim 15, wherein the operations further comprise:
  obtaining a second signal feature information set according to multiple second wireless signals on multiple channels involved in a channel hopping; and
  applying second quantization to a second signal feature information set with a second quantization parameter to generate a second bit string and a second helper data, wherein the second helper data is the second signal feature information that is discarded during the second quantization; and wherein transmitting the first message comprising the second signal feature information to the first authentication device comprises:
  transmitting a third message comprising the second bit string to the first authentication device, wherein the first message comprises the third message, the second signal feature information comprises the second bit string, and the first message authentication code comprises a third message authentication code calculated for the second bit string using at least one of the first key or information about signing the second bit string with a private key of the second authentication device.

18. The device according to claim 16, wherein the operations further comprise:
  transmitting a fourth message to the first authentication device, wherein the fourth message comprises a channel sequence and a time parameter for indicating a wait period on each channel involved in the channel hopping, the channel sequence and the time parameter are encrypted according to the first key, and the fourth message further comprises a fourth message authentication code calculated for the channel sequence and the time parameter using at least one of the first key or information about signing the channel sequence and the time parameter with the private key of the second authentication device; and
  obtaining the second signal feature information set according to the multiple second wireless signals on the multiple channels involved in the channel hopping started from the channel sequence every first period, wherein the first period is the time parameter plus a second period, and the second period is a period starting from hopping onto a new channel to obtaining the first signal feature information.

19. The device according to claim 15, wherein the second signal feature information comprises at least one of received signal strength (RSS) or a link quality indicator (LQI).

20. The device according to claim 15, wherein the first message authentication code is calculated based on a secure hash algorithm.

* * * * *